(12) United States Patent
Aoshima et al.

(10) Patent No.: US 12,139,572 B2
(45) Date of Patent: Nov. 12, 2024

(54) CONJUGATED DIENE COPOLYMER AND METHOD FOR MANUFACTURING CONJUGATED DIENE COPOLYMER

(71) Applicants: ZS ELASTOMERS CO., LTD., Tokyo (JP); SUMITOMO CHEMICAL COMPANY, LIMITED, Tokyo (JP); ZEON CORPORATION, Tokyo (JP)

(72) Inventors: Hiroshi Aoshima, Ichihara (JP); Jesus Rodriguez Castanon, Sodegaura (JP); Hisakatsu Hama, Sodegaura (JP)

(73) Assignees: ZS ELASTOMERS CO., LTD., Tokyo (JP); SUMITOMO CHEMICAL COMPANY, LIMITED, Tokyo (JP); SEON CORPORATION, Tokyo (JP)

( * ) Notice: Subject to any disclaimer, the term of this patent is extended or adjusted under 35 U.S.C. 154(b) by 588 days.

(21) Appl. No.: 17/441,077

(22) PCT Filed: Mar. 27, 2020

(86) PCT No.: PCT/JP2020/014288
§ 371 (c)(1),
(2) Date: Sep. 20, 2021

(87) PCT Pub. No.: WO2020/196886
PCT Pub. Date: Oct. 1, 2020

(65) Prior Publication Data
US 2022/0185919 A1    Jun. 16, 2022

(30) Foreign Application Priority Data
Mar. 28, 2019  (JP) .................. 2019-062529

(51) Int. Cl.
*C08F 36/04*  (2006.01)
*B60C 1/00*  (2006.01)
*C08F 8/34*  (2006.01)

(52) U.S. Cl.
CPC ............. *C08F 36/04* (2013.01); *C08F 8/34* (2013.01); *B60C 1/00* (2013.01)

(58) Field of Classification Search
None
See application file for complete search history.

(56) References Cited

U.S. PATENT DOCUMENTS

| 4,575,534 A | * | 3/1986 | Oshima | C08L 21/00 525/271 |
| 11,667,609 B2 | * | 6/2023 | Otsuka | C07D 211/96 524/102 |
| 2020/0031976 A1 | | 1/2020 | Aoshima | |

FOREIGN PATENT DOCUMENTS

| CN | 103374137 A | 10/2013 |
| GB | 1130542 A | 10/1968 |

(Continued)

OTHER PUBLICATIONS

Dec. 14, 2022 Office Action issued in Chinese Patent Application No. 202080025143.1.

(Continued)

*Primary Examiner* — Satya B Sastri
(74) *Attorney, Agent, or Firm* — Oliff PLC

(57) ABSTRACT

A conjugated diene copolymer has a covalent bond reversibly dissociated and added by heat, and has at least two peaks in each of curves of molecular weight distributions measured at 40° C. and 60° C. by gel permeation chromatography, wherein a change rate of the proportion of the area of the peak having the lowest molecular weight in measurement at 60° C. to the proportion of the area of the peak having the lowest molecular weight in measurement at 40° C.

8 Claims, 2 Drawing Sheets

(56) References Cited

FOREIGN PATENT DOCUMENTS

| JP | S61-255917 A | 11/1986 |
| JP | H01-029802 B2 | 6/1989 |
| JP | 2014-080535 A | 5/2014 |
| JP | 2015-127383 A | 7/2015 |
| JP | 2016-006148 A | 1/2016 |
| JP | 2017-202980 A | 11/2017 |
| JP | 2018-172548 A | 11/2018 |

OTHER PUBLICATIONS

Sep. 28, 2021 International Preliminary Report on Patentability issued in International Patent Application PCT/JP2020/014288.
Irigoyen, M. et al., "Diselenide Bonds as an Alternative to Outperform the Efficiency of Disulfides in Self-Healing Materials," The Journal of Organic Chemistry, 2019, vol. 84, pp. 4200-4210.
Feb. 6, 2023 extended Search Report issued in European Patent Application No. 20777063.7.
Oct. 9, 2023 Office Action issued in Chinese Patent Application No. 202080025143.1.

* cited by examiner

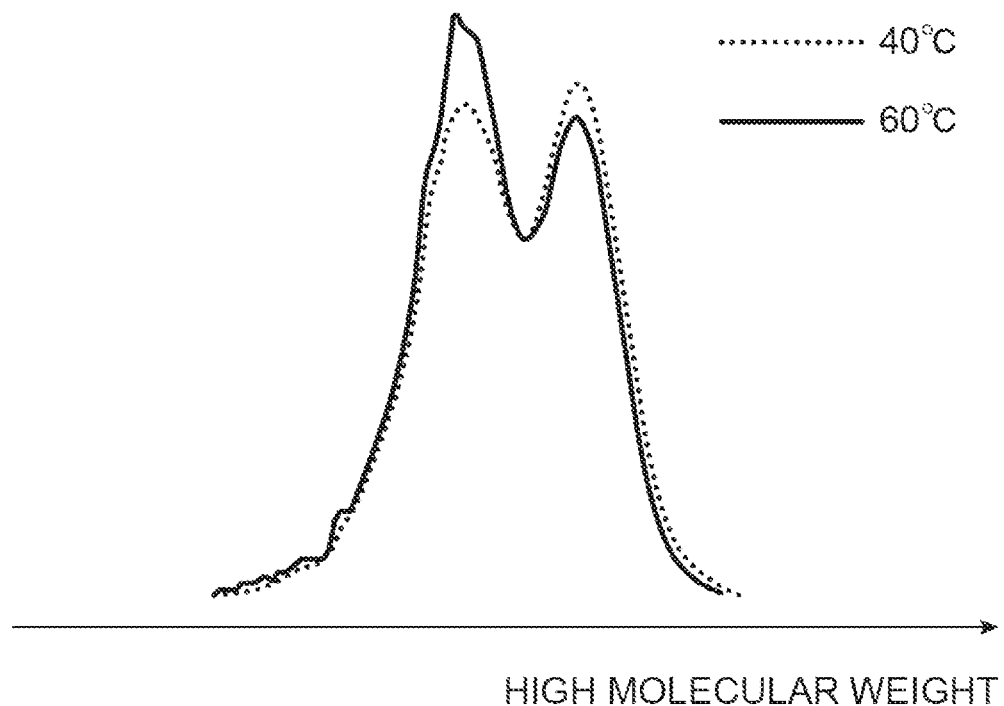

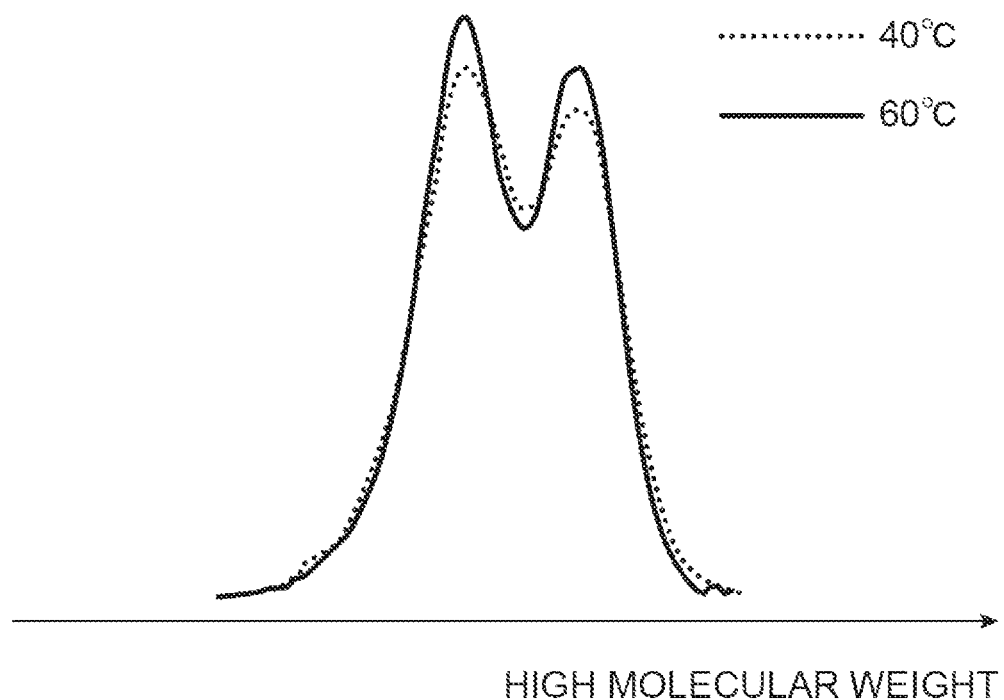

CONJUGATED DIENE COPOLYMER AND METHOD FOR MANUFACTURING CONJUGATED DIENE COPOLYMER

TECHNICAL FIELD

The present invention relates to a conjugated diene copolymer and a method for manufacturing a conjugated diene copolymer.

BACKGROUND ART

As polymer compositions for motor vehicle tires, polymer compositions comprising a conjugated diene polymer such as polybutadiene or butadiene-styrene copolymer are used, for example. Recently, high mechanical strength is required for the polymer composition used in tires for motor vehicles due to environmental and resource problems.

For example, in PTL 1, an improvement in mechanical strength of the conjugated diene polymer is investigated by increasing the molecular weight of a polymer using a coupling agent such as a silane compound when the conjugated diene polymer is produced. Moreover, in PTL 2, an improvement in mechanical strength of the conjugated diene polymer is investigated by increasing the molecular weight of a polymer using a coupling agent such as a tin compound when the conjugated diene polymer is produced.

CITATION LIST

Patent Literature

PTL 1: JP S61-255917 A
PTL 2: JP H1-29802 B2

SUMMARY OF INVENTION

Technical Problem

However, in the conjugated diene polymer produced using a silane compound, a tendency that inferior kneading processability when the polymer composition is prepared is found, although the mechanical strength can be improved; and in the conjugated diene polymer produced using a tin compound, a tendency that the mechanical strength is reduced due to a weak carbon-tin bond in the polymer is found, although the kneading processability is excellent. For this reason, compatibility between the kneading processability of the conjugated diene polymer and the mechanical strength thereof is required.

Thus, an object of the present invention is to provide a conjugated diene copolymer having a good balance between kneading processability and mechanical strength and a method for manufacturing the conjugated diene copolymer.

Solution to Problem

The present invention relates to a conjugated diene copolymer which has a covalent bond reversibly dissociated and added by heat, has at least two peaks in each of curves of molecular weight distributions measured at 40° C. and 60° C. by gel permeation chromatography, wherein a change rate of the proportion of the area of the peak having the lowest molecular weight in measurement at 60° C. to the proportion of the area of the peak having the lowest molecular weight in measurement at 40° C. is 2% or more.

The present invention also relates to a conjugated diene copolymer having a structure represented by the following formula (1).

[Chemical Formula 1]

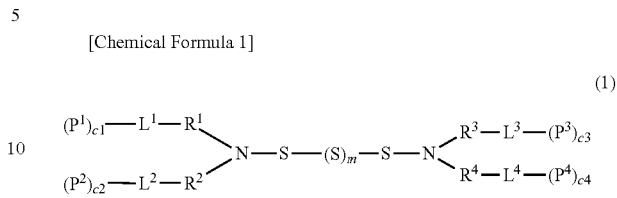

In the formula (1), in represents an integer of 0 to 30, $P^1$, $P^2$, $P^3$, and $P^4$ represent a polymer chain containing conjugated diene units, c1, c2, c3, and c4 each independently represent an integer of 0 to 3, c1+c2+c3+c4 is 1 or more, $R^1$, $R^2$, $R^3$, and $R^4$ represent a hydrocarbyl group optionally having a substituent or $R^1$ and $R^2$ and/or $R^3$ and $R^4$ are bonded to represent a hydrocarbylene group or an aromatic heterocyclic ring optionally having at least one atom selected from the group consisting of a silicon atom, a nitrogen atom, and an oxygen atom, and $L^1$, $L^2$, $L^3$, and $L^4$ represent a hydrogen atom or any bonding group.

The present invention further relates to a method for manufacturing a conjugated diene copolymer, comprising: a step of polymerizing a monomer containing a conjugated diene in a hydrocarbon solvent in the presence of a polymerization initiator to yield a conjugated diene copolymer having an active terminal; and a step of reacting the conjugated diene copolymer having an active terminal with a compound having a covalent bond reversibly dissociated and added by heat to yield a conjugated diene copolymer having the covalent bond.

Advantageous Effects of Invention

According to the present invention, a conjugated diene copolymer having a good balance between kneading processability and mechanical strength and a method for manufacturing the conjugated diene copolymer can be provided.

BRIEF DESCRIPTION OF DRAWINGS

FIG. 1 is a GPC chart of the conjugated diene copolymer in Example 1.
FIG. 2 is a GPC chart of the conjugated diene copolymer in Comparative Example 1.

DESCRIPTION OF EMBODIMENTS

An embodiment will be described in detail. It is noted that the present invention is not limited to the embodiment below.

In this specification, the hydrocarbyl group represents a monovalent group of a hydrocarbon from which one hydrogen atom is removed. The hydrocarbylene group represents a divalent group of a hydrocarbon from which two hydrogen atoms are removed. The hydrocarbyloxy group represents a monovalent group having a structure in which the hydrogen atom of a hydroxy group is replaced with a hydrocarbyl group. An amino group having a substituent (hereinafter, also referred to as "substituted amino group" in some cases) represents a group having a structure in which at least one hydrogen atom of the amino group is replaced with a monovalent atom other than a hydrogen atom or a monovalent group, or a group having a structure in which two hydrogen atoms of the amino group are replaced with a divalent group. A hydrocarbyl group having a substituent (hereinafter, also referred to as "substituted hydrocarbyl group" in some cases) represents a monovalent group having a structure in which at least one hydrogen atom of the hydrocarbyl group is replaced with a substituent. A hydrocarbylene group having a nitrogen atom and/or an oxygen atom represents a divalent group having a structure in which a carbon atom other than the carbon atom of the hydrocarbylene group from which the hydrogen atom is removed and/or a hydrogen atom is replaced with a group having a nitrogen atom and/or an oxygen atom.

[Conjugated Diene Copolymer]

The conjugated diene copolymer according to the present embodiment has a covalent bond reversibly dissociated and added by heat (hereinafter, also referred to as "dynamic covalent bond" in some cases). The conjugated diene copolymer has at least two peaks in each of curves of molecular weight distributions measured at 40° C. and 60° C. by gel permeation chromatography (GPC), and a change rate of the proportion of the area of the peak having the lowest molecular weight in measurement at 60° C. to the proportion of the area of the peak having the lowest molecular weight in measurement at 40° C. is 2% or more.

The reason why the peak area is changed is that the dynamic covalent bond which the conjugated diene copolymer has does not dissociate at 40° C. but dissociates at 60° C. In the conjugated diene copolymer according to the present embodiment, the molecular weight of the polymer is reduced by dissociation of the dynamic covalent bond by heat, and thus the viscosity when the conjugated diene copolymer is kneaded with heating can be reduced. In contrast, the present inventors infer that when the temperature reduces after kneading, the dissociated dynamic covalent bond is added or the like, enabling maintenance of mechanical strength.

The change rate is preferably 2% or more, more preferably 5% or more, still more preferably 8% or more, particularly preferably 10% or more to improve kneading processability. The upper limit value of the change rate may be 130% or less, 100% or less, 80% or less, 60% or less, or 40% or less.

The dynamic covalent bond is preferably a polysulfide bond, more preferably a diaminopolysulfide bond, still more preferably a diaminodisulfide bond.

The conjugated diene copolymer according to the present embodiment has polymer chains based on conjugated diene units based on a conjugated diene compound. To improve mechanical strength, the conjugated diene copolymer may further have aromatic vinyl units based on an aromatic vinyl compound. In other words, the conjugated diene copolymer may have polymer chains based on a conjugated diene compound and an aromatic vinyl compound.

Examples of the conjugated diene compound include 1,3-butadiene, isoprene, 1,3-pentadiene, 2,3-dimethyl-1,3-butadiene, 2-phenyl-1,3-butadiene, 1,3-pentadiene, 1,3-hexadiene, 4,5-diethyl-1,3-octadiene, and 3-butyl-1,3-octadiene. The conjugated diene compound is preferably 1,3-butadiene or isoprene. These conjugated diene compounds may be used alone or in combination of two or more thereof.

Examples of the aromatic vinyl compound include styrene, α-methylstyrene, α-methyl-p-methylstyrene, methylstyrene, ethylstyrene, t-butylstyrene, vinyl naphthalene, divinylbenzene, trivinylbenzene, and divinylnaphthalene. The aromatic vinyl compound is preferably styrene. These aromatic vinyl compounds may be used alone or in combination of two or more thereof.

The conjugated diene copolymer according to the present embodiment can have a structure represented by the following formula (1).

[Chemical Formula 2]

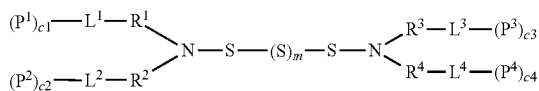

(1)

In the formula (1), m represents an integer of 0 to 30, $P^1$, $P^2$, $P^3$, and $P^4$ represent a polymer chain containing aromatic vinyl monomer units, c1, c2, c3, and c4 each independently represent an integer of 0 to 3, c1+c2+c3+c4 is 1 or more, $R^1$, $R^2$, $R^3$, and $R^4$ represent a hydrocarbylene group optionally having a substituent or $R^1$ and $R^2$ and/or $R^3$ and $R^4$ are bonded to represent a hydrocarbylene group or an aromatic heterocyclic ring optionally having at least one atom selected from the group consisting of a silicon atom, a nitrogen atom, and an oxygen atom, and $L^1$, $L^2$, $L^3$, and $L^4$ represent a hydrogen atom or any bonding group.

In $R^1$, $R^2$, $R^3$, and $R^4$, the hydrocarbylene group optionally having a substituent is a hydrocarbylene group or a substituted hydrocarbylene group. Examples of the hydrocarbylene group include alkylene groups, alkenediyl groups, arylene groups, and groups formed by an arylene group bonded with an alkylene group (hereinafter, also referred to as arylene-alkylene groups in some cases). Examples of the alkylene groups include a methylene group, an ethylene group, a propylene group, a tetramethylene group, a pentamethylene group, a hexamethylene group, a heptamethylene group, an octamethylene group, and a 2,2,4-trimethylhexane-1,6-diyl group. Examples of the alkenediyl groups include a pentan-2-ene-1,5-diyl group. Examples of the arylene groups include a phenylene group, a naphthylene group, and a biphenylene group. Examples of the arylene-alkylene groups include a phenylene-alkylene group, a naphthylene-alkylene group, and a biphenylene-alkylene group.

Examples of the substituted hydrocarbylene group include hydrocarbylene groups having at least one atom selected from the group consisting of a nitrogen atom, an oxygen atom, and a sulfur atom. Examples of nitrogen atom-containing hydrocarbylene groups include a group represented by —CH=N—CH=CH— and a group represented by —CH=N—CH$_2$—CH$_2$—. Examples of oxygen atom-containing hydrocarbylene groups include a group represented by —CH$_2$—CH$_2$—O—CH$_2$—CH$_2$—. Examples of sulfur atom-containing hydrocarbylene groups include a group represented by —CH$_2$—CH$_2$—S—CH$_2$—CH$_2$—.

$R^1$ and $R^2$ and/or $R^3$ and $R^4$ together with a nitrogen atom may form a cycloheteroalkyl group or a nitrogen-containing aromatic heterocyclic group. The hydrogen atom at any position of the cycloheteroalkyl group or the nitrogen-containing aromatic heterocyclic group may be replaced with $L^1$, $L^2$, $L^3$, and $L^4$. The formula (1) may have a cyclic structure in which $R^1$ and $R^2$ are bonded and may have a cyclic structure in which $R^3$ and $R^4$ are bonded. $L^1$, $L^2$, $L^3$, and $L^4$ represent a hydrogen atom or any bonding group. The any bonding group represents a structure obtained by a reaction of a functional group reactive with a conjugated diene copolymer having an active terminal, and represents a hydrocarbylene group optionally having at least one atom selected from the group consisting of a nitrogen atom, an oxygen atom, a sulfur atom, a silicon atom, and halogen atoms.

In the formula (1), in is 0 to 30, preferably 0 to 20, more preferably 0 to 10, still more preferably 0 to 5, particularly preferably 0 or 1, most preferably 0.

The structure represented by the formula (1) can be introduced into the conjugated diene copolymer by reacting the conjugated diene copolymer having an active terminal using a compound represented by the following formula (2) as a coupling agent. In other words, the conjugated diene copolymer according to the present embodiment can have a dynamic covalent bond based on a compound represented by the formula (2). The compound represented by the formula (2) has a property such that the polysulfide bond dissociates when the temperature increases and returns to the original structure when the temperature reduces.

[Chemical Formula 3]

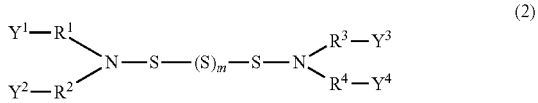

(2)

In the formula (2), in represents an integer of 0 to 30, $R^1$, $R^2$, $R^3$, and $R^4$ represent a hydrocarbylene group optionally having a substituent or $R^1$ and $R^2$ and/or $R^3$ and $R^4$ are bonded to represent a hydrocarbylene group or an aromatic heterocyclic ring optionally having at least one atom selected from the group consisting of a silicon atom, a nitrogen atom, and an oxygen atom, and $Y^1$, $Y^2$, $Y^3$, and $Y^4$ represent a hydrogen atom or a functional group reactive with a diene copolymer having an active terminal.

Examples of the functional group reactive with a diene copolymer having an active terminal include a glycidyl ether group, an (meth)acryloyl group, a vinyl group, an allyl group, an alkoxy group, a phenoxy group, a benzyloxy group, an alkoxysilyl group, a carbonyl group, halogen groups, and an isocyanate group.

The conjugated diene copolymer according to the present embodiment may further have units based on a modifier containing a heteroatom. The conjugated diene copolymer, if modified with a compound having a heteroatom, can enhance dispersibility of a filler compounded when the polymer composition described later is prepared. The compound having a heteroatom is a compound not having a dynamic covalent bond.

Examples of the heteroatom include an oxygen atom, a nitrogen atom, a sulfur atom, and a silicon atom. As a modifier containing nitrogen and/or silicon, a compound having a structure represented by the formula (3) can be used. The compound has a functional group copolymerizable with the conjugated diene compound. By polymerizing the conjugated diene compound and the compound having the structure represented by the formula (3), a conjugated diene copolymer having units based on the compound having the structure represented by the formula (3) in the chains can be given.

[Chemical Formula 4]

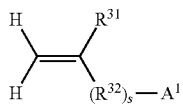

(3)

In the formula (3), $R^{31}$ represents a hydrogen atom or a hydrocarbyl group, s represents 0 or 1 (an integer of 0 to 1), $R^{32}$ represents a hydrocarbylene group, and $A^1$ represents a substituted amino group, a nitrogen-containing heterocyclic ring group, or a substituted silyl group.

Examples of the hydrocarbyl group for $R^{31}$ include alkyl groups, alkenyl groups, and aryl groups.

The alkyl groups are preferably alkyl groups having 1 to 12 carbon atoms; examples thereof can include a methyl group, an ethyl group, an n-propyl group, an isopropyl group, an n-butyl group, a sec-butyl group, and a tert-butyl group, and preferred is a methyl group. The alkenyl groups are preferably alkenyl groups having 2 to 12 carbon atoms; examples thereof can include a vinyl group, an allyl group, a 1-propenyl group, and an isopropenyl group, and preferred is a vinyl group. The aryl groups are preferably aryl groups having 6 to 12 carbon atoms; examples thereof can include a phenyl group, a methylphenyl group, and an ethylphenyl group, and preferred is a phenyl group.

$R^{31}$ is preferably a hydrogen atom, a methyl group, a vinyl group, or a phenyl group, more preferably a hydrogen atom.

Examples of the hydrocarbylene group for $R^{32}$ can include alkylene groups, arylene groups, and groups formed of an arylene group bonded to an alkylene group.

The alkylene groups are preferably alkylene groups having 2 to 6 carbon atoms; examples thereof can include a methylene group, an ethylene group, and a trimethylene group, and more preferred is a methylene group or an ethylene group. The arylene groups are preferably arylene groups having 5 to 12 carbon atoms; examples thereof include a phenylene group, a naphthylene group, and a biphenylene group, and more preferred is a phenylene group. Examples of the groups formed of an arylene group bonded to an alkylene group include groups of a phenylene group bonded to alkylene groups, groups of a naphthylene group bonded to alkylene groups, and groups of a biphenylene group bonded to alkylene groups, and preferred are groups of a phenylene group bonded to alkylene groups.

In the groups formed of an arylene group bonded to an alkylene group, preferably, the carbon atom of the arylene group contained in the groups is bonded to the carbon atom to which $R^{31}$ in the formula (3) is bonded.

Examples of the groups formed of a phenylene group bonded to an alkylene group (phenylene-alkylene groups) can include groups represented by the formula (3-R).

[Chemical Formula 5]

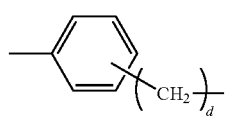

(3-R)

In the formula, d represents an integer of 1 to 10.

Examples of the phenylene-alkylene groups include para-phenylene-alkylene groups, meta-phenylene-alkylene groups, and ortho-phenylene-alkylene groups according to the position of the carbon atom on the benzene ring to which the alkylene group is bonded. In the case of the groups represented by the formula (3-R), the para-phenylene-alkylene groups are groups represented by the formula (3-Ra), the meta-phenylene-alkylene groups are groups represented by the formula (3-Rb), and the ortho-phenylene-alkylene groups are groups represented by the formula (3-Rc).

[Chemical Formula 6]

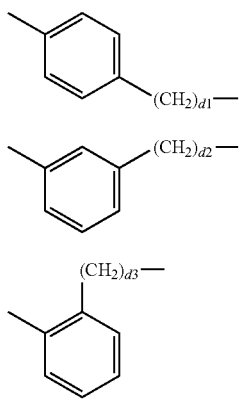

In the formulas, d1, d2, and d3 each independently represent an integer of 1 to 10.

The groups formed of an arylene group bonded to an alkylene group are preferably groups formed of a phenylene group bonded to an alkylene group (phenylene-alkylene groups), more preferably the groups represented by the formula (3-Ra) or the groups represented by the formula (3-Rb), still more preferably a para-phenylene-methylene group (the group represented by the formula (3-Ra) in which d1=1), a meta-phenylene-methylene group (the group represented by the formula (3-Rb) in which d2=1), a para-phenylene-ethylene group (the group represented by the formula (3-Ra) in which d1=2), or a meta-phenylene-ethylene group (the group represented by the formula (3-Rb) in which d2=2).

Examples of the substituted amino group for $A^1$ include groups represented by the formula (3-X) and groups represented by the formula (3-Y).

[Chemical Formula 7]

In the formula (3-X), $R^{33}$ and $R^{34}$ each independently represent a hydrocarbyl group or a trihydrocarbylsilyl group, or represent a hydrocarbylene group formed of part of $R^{33}$ bonded to part of $R^{34}$ and optionally having a nitrogen atom and/or an oxygen atom.

[Chemical Formula 8]

In the formula (3-Y), $R^{35}$ represents a hydrocarbylidene group. To be noted, $R^{35}$ is a group corresponding to a group in the formula (3-X) in which $R^{33}$ and $R^{34}$ form one group and bond to a nitrogen atom with a double bond.

Examples of the hydrocarbyl group for $R^{33}$ and $R^{34}$ can include alkyl groups, alkenyl groups, alkynyl groups, aryl groups, and aralkyl groups. The alkyl groups are preferably alkyl groups having 1 to 12 carbon atoms, and examples thereof can include a methyl group, an ethyl group, an n-propyl group, an isopropyl group, an n-butyl group, a sec-butyl group, and a tert-butyl group. The alkenyl groups are preferably alkenyl groups having 2 to 12 carbon atoms, and examples thereof can include a vinyl group, an allyl group, a 1-propenyl group, and an isopropenyl group. The alkynyl groups are preferably alkynyl groups having 2 to 12 carbon atoms, and examples thereof can include an ethynyl group and a 2-propynyl group. The aryl groups are preferably aryl groups having 6 to 12 carbon atoms, and examples thereof can include a phenyl group, a tolyl group, and a xylyl group. The aralkyl groups are preferably aralkyl groups having 7 to 13 carbon atoms, and examples thereof can include a benzyl group.

The number of carbon atoms of the hydrocarbyl group is preferably 1 to 10, more preferably 1 to 4, still more preferably 1 to 2. The hydrocarbyl group is preferably an alkyl group, more preferably a linear alkyl group.

Examples of the trihydrocarbylsilyl group for $R^{33}$ and $R^{34}$ can include trialkylsilyl groups having 3 to 12 carbon atoms, such as a trimethylsilyl group, a triethylsilyl group, a triisopropylsilyl group, and a tert-butyl-dimethylsilyl group.

The trihydrocarbylsilyl group is preferably trialkylsilyl groups having 3 to 9 carbon atoms, more preferably trialkylsilyl groups having a silicon atom bonded to alkyl groups having 1 to 3 carbon atoms, still more preferably a trimethylsilyl group.

Examples of the hydrocarbylene group formed of part of $R^{33}$ bonded to part of $R^{34}$ and optionally having a nitrogen atom and/or an oxygen atom can include hydrocarbylene groups, nitrogen atom-containing hydrocarbylene groups, and oxygen atom-containing hydrocarbylene groups.

Examples of the hydrocarbylene groups can include alkylene groups such as an ethylene group, a trimethylene group, a tetramethylene group, a pentamethylene group, and a hexamethylene group.

Examples of the nitrogen atom-containing hydrocarbylene groups can include a group represented by —$CH_2CH_2$—NH—$CH_2$—, a group represented by —$CH_2CH_2$—N═CH—, a group represented by —CH═CH—N═CH—, and a group represented by —$CH_2CH_2$—NH—$CH_2CH_2$—. Examples of the oxygen atom-containing hydrocarbylene groups can include a group represented by —$CH_2CH_2$—O—$CH_2CH_2$—.

The number of carbon atoms of the hydrocarbylene group optionally having a nitrogen atom and/or an oxygen atom is preferably 2 to 20, more preferably 2 to 7, still more preferably 4 to 6.

The hydrocarbylene group optionally having nitrogen atom and/or an oxygen atom is preferably a hydrocarbylene group, more preferably an alkylene group, still more preferably a polymethylene group.

$R^{33}$ and $R^{34}$ are each independently preferably an alkyl group, a trialkylsilyl group, or an alkylene group formed of part of $R^{33}$ bonded to part of $R^{34}$, and are each independently more preferably an alkyl group.

Examples of the groups represented by the formula (3-X) can include non-cyclic amino groups or cyclic amino groups.

Examples of the non-cyclic amino groups in which $R^{33}$ and $R^{34}$ in the formula (3-X) are a hydrocarbyl group can include dialkylamino groups such as a dimethylamino group, a diethylamino group, a di(n-propyl)amino group, a di(isopropyl)amino group, a di(n-butyl)amino group, a di(sec-butyl)amino group, a di(tert-butyl)amino group, and an ethylmethylamino group.

Examples of the non-cyclic amino groups in which $R^{33}$ and $R^{34}$ in the formula (3-X) are a trihydrocarbylsilyl group can include bis(trialkylsilyl)amino groups such as a bis(trimethylsilyl)amino group and a bis(tert-butyl-dimethylsilyl)amino group.

Examples of the cyclic amino groups where in the formula (3-X), the group formed of part of $R^{33}$ bonded to part of $R^{34}$ is a hydrocarbylene group can include a 1-aziridinyl group, a 1-azetidinyl group, a 1-pyrrolidinyl group, a 1-piperidinyl group, a 1-hexamethyleneimino group, and a 1-pyrrolyl group.

Examples of the cyclic amino groups where in the formula (3-X), the group formed of part of $R^{33}$ bonded to part of $R^{34}$ is a nitrogen atom-containing hydrocarbylene group can include a 1-imidazolyl group, a 4,5-dihydro-1-imidazolyl group, a 1-imidazolidinyl group, and a 1-piperazinyl group.

Examples of the cyclic amino groups where in the formula (3-X), the group formed of part of $R^{33}$ bonded to part of $R^{34}$ is an oxygen atom-containing hydrocarbylene group can include a morpholino group.

Examples of the hydrocarbylidene for $R^{35}$ can include an ethylidene group, a propylidene group, butylidene group, a 1-methylethylidene group, a 1-methylpropylidene group, and a 1,3-dimethylbutylidene group. The number of carbon atoms of the hydrocarbylidene group is preferably 2 to 20, more preferably 2 to 6.

Examples of the groups represented by the formula (3-Y) can include non-cyclic amino groups such as an ethylideneamino group, a 1-methylpropylideneamino group, a 1,3-dimethylbutylideneamino group, a 1-methylethylideneamino group, and a 4-N,N-dimethylaminobenzylideneamino group.

Examples of the nitrogen-containing heterocyclic group for $A^1$ can include nitrogen-containing alicyclic heterocyclic groups and nitrogen-containing aromatic heterocyclic groups. The nitrogen-containing alicyclic heterocyclic group represents a group formed of a compound having a nitrogen-containing alicyclic heterocyclic ring from which one hydrogen atom is removed from the hydrogen atoms bonded to the carbon atoms of the heterocyclic ring, and the nitrogen-containing alicyclic heterocyclic ring represents an alicyclic heterocyclic ring having a nitrogen atom as a heteroatom included in the atoms which constitute the ring. The nitrogen-containing aromatic heterocyclic group represents a group formed of a compound having a nitrogen-containing aromatic heterocyclic ring from which one hydrogen atom is removed from the hydrogen atoms bonded to the carbon atoms of the heterocyclic ring, and the nitrogen-containing aromatic heterocyclic ring represents an aromatic heterocyclic ring having a nitrogen atom as a heteroatom included in the atoms which constitute the ring.

Examples of the nitrogen-containing aromatic heterocyclic group having only a nitrogen atom as a heteroatom included in the atoms which constitute the ring can include groups having a pyrrole ring, groups having an imidazole ring, groups having a pyrazole ring, groups having a pyridine ring, groups having a pyridazine ring, groups having a pyrimidine ring, and groups having a pyrazine ring.

Examples of the groups having a pyrrole ring can include a 2-pyrrolyl group, a 3-pyrrolyl group, a 1-alkyl-2-pyrrolyl group, and a 1-alkyl-3-pyrrolyl group. Examples of the groups having an imidazole ring can include a 2-imidazolyl group, a 4-imidazolyl group, a 5-imidazolyl group, a 1-alkyl-2-imidazolyl group, a 1-alkyl-4-imidazolyl group, and a 1-alkyl-5-imidazolyl group. Examples of the groups having a pyridine ring can include a 2-pyridyl group, a 3-pyridyl group, and a 4-pyridyl group. The nitrogen-containing aromatic heterocyclic group having only a nitrogen atom as a heteroatom included in the atoms which constitute the ring is preferably groups having an imidazole ring and the groups having a pyridine ring.

Examples of the compounds represented by the formula (3) in which $R^{31}$ is a hydrogen atom, s is 1, $R^{32}$ is a phenylene group, and $A^1$ is a substituted amino group can include 4-dimethylaminostyrene, 4-diethylaminostyrene, 4-dipropylaminostyrene, 4-dibutylaminostyrene, 4-bis(trimethylsilyl)aminostyrene, 4-bis(tert-butyl-dimethylsilyl)aminostyrene, 4-(1-pyrrolidinyl) styrene, 4-(1-piperidinyl)styrene, and 4-(1-hexamethyleneimino)styrene.

Examples of the compounds represented by the formula (3) in which $R^{31}$ is a hydrogen atom, s is 1, $R^{32}$ is a group represented by the formula (3-Ra), d1 in the formula (3-Ra) is 1 or 2, and $A^1$ is a substituted amino group can include 4-(dimethylaminomethyl)styrene, 4-(diethylaminomethyl)styrene, 4-[bis(trimethylsilyl)aminomethyl]styrene, 4-[bis(tert-butyl-dimethylsilyl)aminomethyl]styrene, 4-(1-pyrrolidinyl)methylstyrene, 4-(1-piperidinyl)methylstyrene, 4-(1-hexamethyleneimino)methylstyrene, 4-[2-(dimethylamino)ethyl]styrene, 4-[2-(diethylamino)ethyl]styrene, 4-{2-[bis(trimethylsilyl)amino]ethyl}styrene, 4-{2-[bis(tert-butyl-dimethylsilyl)amino]ethyl}styrene, 4-[2-(1-pyrrolidinyl)ethyl]styrene, 4-[2-(1-piperidinyl)ethyl]styrene, and 4-[2-(1-hexamethyleneimino)ethyl]styrene.

Examples of the compounds represented by the formula (3) in which $R^{31}$ is a vinyl group, s is 0, and $A^1$ is a substituted amino group can include 2-dimethylamino-1,3-butadiene, 2-diethylamino-1,3-butadiene, 2-[bis(trimethylsilyl)amino]-1,3-butadiene, 2-[bis(tert-butyl-dimethylsilyl)amino]-1,3-butadiene, 2-(1-pyrrolidinyl)-1,3-butadiene, 2-(1-piperidinyl)-1,3-butadiene, 2-(1-hexamethyleneimino)-1,3-butadiene, 2-(1-pyrrolyl)-1,3-butadiene, and 2-(1-imidazolyl)-1,3-butadiene.

Examples of the compounds represented by the formula (3) in which $R^{31}$ is a phenyl group, s is 1, $R^{32}$ is a phenylene group, and $A^1$ is a substituted amino group can include 1-(4-dimethylaminophenyl)-1-phenylethylene, 1-(4-diethylaminophenyl)-1-phenylethylene, 1-[4-(1-pyrrolidinyl)phenyl]-1-phenylethylene, 1-[4-(1-piperidinyl)phenyl]-1-phenylethylene, 1-[4-(1-hexamethyleneimino)phenyl]-1-phenylethylene, 1-(4-morpholinophenyl)-1-phenylethylene, 1-{4-[bis(trimethylsilyl)amino]phenyl}-1-phenylethylene, and 1-{4-[bis(tert-butyl-dimethylsilyl)amino]phenyl}-1-phenylethylene.

Examples of the compounds represented by the formula (3) in which $R^{31}$ is a hydrogen atom, s is 0, and $A^1$ is a nitrogen-containing aromatic heterocyclic group can include 1-methyl-2-vinylimidazole, 1-methyl-4-vinylimidazole, 1-methyl-5-vinylimidazole, 2-vinylpyridine, 3-vinylpyridine, and 4-vinylpyridine.

The compound represented by the formula (3) in which $A^1$ is a substituted amino group or a nitrogen-containing heterocyclic ring is particularly preferably 4-[2-(1-pyrrolidinyl)ethyl]styrene, 3-[2-(1-pyrrolidinyl)ethyl]styrene, 4-vinylpyridine, or 3-vinylpyridine.

Examples of the substituted silyl group for $A^1$ can include a group represented by the formula (3-Z).

[Chemical Formula 9]

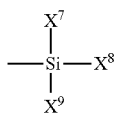
(3-Z)

In the formula (3-Z), $X^7$, $X^8$, and $X^9$ represent each independently a substituted amino group or a hydrocarbyl group optionally having a substituent, and at least one of $X^7$, $X^8$, and $X^9$ is a substituted amino group.

Examples of the hydrocarbyl group optionally having a substituent for $X^7$, $X^8$, and $X^9$ can include hydrocarbyl groups and substituted hydrocarbyl groups.

Examples of the hydrocarbyl groups for $X^7$, $X^8$, and $X^9$ can include alkyl groups, alkenyl groups, alkynyl groups, aryl groups, and aralkyl groups. The alkyl groups are preferably alkyl groups having 1 to 12 carbon atoms, and examples thereof can include a methyl group, an ethyl group, an n-propyl group, an isopropyl group, an n-butyl group, a sec-butyl group, and a tert-butyl group. The alkenyl groups are preferably alkenyl groups having 2 to 12 carbon atoms, and examples thereof can include a vinyl group, an allyl group, a 1-propenyl group, and an isopropenyl group. The alkynyl groups are preferably alkynyl groups having 2 to 12 carbon atoms, and examples thereof can include an ethynyl group and a 2-propynyl group. The aryl groups are preferably aryl groups having 6 to 12 carbon atoms, and examples thereof can include a phenyl group, a tolyl group, and a xylyl group. The aralkyl groups are preferably aralkyl groups having 7 to 13 carbon atoms, and examples thereof can include a benzyl group. The hydrocarbyl group is preferably an alkyl group.

Examples of the substituted hydrocarbyl group for $X^7$, $X^8$, and $X^9$ can include groups having at least one atom selected from the group of atoms consisting of an oxygen atom, a nitrogen atom, and a silicon atom.

Examples of the substituted hydrocarbyl group having an oxygen atom can include alkoxyalkyl groups such as a methoxymethyl group, a methoxyethyl group, an ethoxymethyl group, and an ethoxyethyl group.

Examples of the substituted hydrocarbyl group having a nitrogen atom can include dialkylaminoalkyl groups such as a dimethylaminomethyl group, a dimethylaminoethyl group, a diethylaminomethyl group, and a diethylaminoethyl group. Examples of the substituted hydrocarbyl group having a silicon atom can include trialkylsilylalkyl groups such as a trimethylsilylmethyl group, a trimethylsilylethyl group, a triethylsilylmethyl group, and a triethylsilylethyl group.

The number of carbon atoms of the hydrocarbyl group optionally having a substituent is preferably 1 to 10, more preferably 1 to 4. The hydrocarbyl group optionally having a substituent is preferably an alkyl group or an alkoxyalkyl group. The alkyl group is still more preferably an alkyl group having 1 to 4 carbon atoms, particularly preferably a methyl group or an ethyl group. The alkoxyalkyl group is preferably an alkoxyalkyl group having 2 to 4 carbon atoms.

Examples of the substituted amino group for $X^7$, $X^8$, and $X^9$ can include the groups represented by the formula (3-X) and the groups represented by the formula (3-Y).

In the formula (3-Z), the substituted amino group for $X^7$, $X^8$, and $X^9$ is preferably a non-cyclic amino group, more preferably a dialkylamino group, still more preferably a dimethylamino group, a diethylamino group, a di(n-propyl) amino group, or a di(n-butyl)amino group, particularly preferably a dimethylamino group or a diethylamino group.

In the formula (3-Z), at least one of $X^7$, $X^8$, and $X^9$ is a substituted amino group; preferably, two or more of $X^7$, $X^8$, and $X^9$ are a substituted amino group; and more preferably, two of $X^7$, $X^8$, and $X^9$ is a substituted amino group.

Examples of the compounds represented by the formula (3) in which $A^1$ is a substituted silyl group, $R^{31}$ is a hydrogen atom, and one of $X^7$, $X^8$, and $X^9$ in the formula (3-Z) is a dialkylamino group can include the following compounds.

Examples of the compound where s in the formula (3) is 0 include (dimethylamino)dimethylvinylsilane, (diethylamino)dimethylvinylsilane, (dipropylamino)dimethylvinylsilane, (dibutylamino)dimethylvinylsilane, (dimethylamino)diethylvinylsilane, (diethylamino)diethylvinylsilane, (dipropylamino)diethylvinylsilane, and (dibutylamino)diethylvinylsilane.

Examples of the compound where s in the formula (3) is 1 include (dimethylamino)dimethyl(4-vinylphenyl)silane, (dimethylamino)dimethyl(3-vinylphenyl)silane, (diethylamino)dimethyl(4-vinylphenyl)silane, (diethylamino)dimethyl(3-vinylphenyl)silane, (dipropylamino)dimethyl(4-vinylphenyl)silane, (dipropylamino)dimethyl(3-vinylphenyl)silane, (dibutylamino)dimethyl(4-vinylphenyl)silane, (dibutylamino)dimethyl(3-vinylphenyl)silane, (dimethylamino)diethyl(4-vinylphenyl)silane, (dimethylamino)diethyl(3-vinylphenyl)silane, (diethylamino)diethyl(4-vinylphenyl)silane, (diethylamino)diethyl(3-vinylphenyl)silane, (dipropylamino)diethyl(4-vinylphenyl)silane, (dipropylamino)diethyl(3-vinylphenyl)silane, (dibutylamino)diethyl(4-vinylphenyl)silane, and (dibutylamino)diethyl(3-vinylphenyl)silane.

Examples of the compounds represented by the formula (3) in which $R^{31}$ is a hydrogen atom, $A^1$ is a substituted silyl group, and two of $X^7$, $X^8$, and $X^9$ in the formula (3-Z) are a dialkylamino group can include the following compounds.

Examples of the compounds in which s in the formula (3) is 0 include bis(dimethylamino)methylvinylsilane, bis(diethylamino)methylvinylsilane, bis(dipropylamino)methylvinylsilane, bis(dibutylamino)methylvinylsilane, bis(dimethylamino)ethylvinylsilane, bis(diethylamino)ethylvinylsilane, bis(dipropylamino)ethylvinylsilane, and bis(dibutylamino)ethylvinylsilane.

Examples of the compounds in which s in the formula (3) is 1 include bis(dimethylamino)methyl(4-vinylphenyl)silane, bis(dimethylamino)methyl(3-vinylphenyl)silane, bis(diethylamino)methyl(4-vinylphenyl)silane, bis(diethylamino)methyl(3-vinylphenyl)silane, bis(dipropylamino)methyl(4-vinylphenyl)silane, bis(dipropylamino)methyl(3-vinylphenyl)silane, bis(dibutylamino)methyl(4-vinylphenyl)silane, bis(dibutylamino)methyl(3-vinylphenyl)silane, bis(dimethylamino)ethyl(4-vinylphenyl)silane, bis(dimethylamino)ethyl(3-vinylphenyl)silane, bis(diethylamino)ethyl(4-vinylphenyl)silane, bis(diethylamino)ethyl(3-vinylphenyl)silane, bis(dipropylamino)ethyl(4-vinylphenyl)silane, bis(dipropylamino)ethyl(3-vinylphenyl)silane, bis(dibutylamino)ethyl(4-vinylphenyl)silane, and bis(dibutylamino)ethyl(3-vinylphenyl)silane.

Examples of the compounds represented by the formula (3) in which $R^{31}$ is a methyl group, $A^1$ is a substituted silyl group, and two of $X^7$, $X^8$, and $X^9$ in the formula (3-Z) are a dialkylamino group can include the following compounds.

Examples of the compounds in which s in the formula (3) is 1 include bis(dimethylamino)methyl(4-isopropenylphenyl)silane, bis(dimethylamino)methyl(3-isopropenylphenyl)silane, bis(diethylamino)methyl(4-isopropenylphenyl)silane, bis(diethylamino)methyl(3-isopropenylphenyl)silane, bis(dipropylamino)methyl(4-isopropenylphenyl)silane, bis(dipropylamino)methyl(3-isopropenylphenyl)silane, bis(dibutylamino)methyl(4-isopropenylphenyl)silane, bis(dibutylamino)methyl(3-isopropenylphenyl)silane, bis(dimethylamino)ethyl(4-isopropenylphenyl)silane, bis(dimethylamino)ethyl(3-isopropenylphenyl)silane, bis(diethylamino)ethyl(4-isopropenylphenyl)silane, bis(diethylamino)ethyl(3-isopropenylphenyl)silane, bis(dipropylamino)ethyl(4-isopropenylphenyl)silane, bis(dipropylamino)ethyl(3-isopropenylphenyl)silane, bis(dibutylamino)ethyl(4-isopropenylphenyl)silane, and bis(dibutylamino)ethyl(3-isopropenylphenyl)silane.

Examples of the compounds represented by the formula (3) in which $R^{31}$ is a vinyl group, $A^1$ is a substituted silyl group, and two of $X^7$, $X^8$, and $X^9$ in the formula (3-Z) are a dialkylamino group can include the following compounds.

Examples of the compounds in which s in the formula (3) is 0 include bis(dimethylamino)methyl(1-methylene-2-propenyl)silane, bis(diethylamino)methyl(1-methylene-2-propenyl)silane, bis(dipropylamino)methyl(1-methylene-2-propenyl)silane, bis(dibutylamino)methyl(1-methylene-2-propenyl)silane, bis(dimethylamino)ethyl(1-methylene-2-propenyl)silane, bis(diethylamino)ethyl(1-methylene-2-propenyl)silane, bis(dipropylamino)ethyl(1-methylene-2-propenyl)silane, and bis(dibutylamino)ethyl(1-methylene-2-propenyl)silane.

Examples of the compounds represented by the formula (3) in which $R^{31}$ is a phenyl group, $A^1$ is a substituted silyl group, and two of $X^7$, $X^8$, and $X^9$ in the formula (3-Z) are a dialkylamino group can include the following compounds.

Examples of the compounds in which s in the formula (3) is 1 include 1-{4-[bis(dimethylamino)methylsilyl]phenyl}-1-phenylethylene, 1-{4-[bis(diethylamino)methylsilyl]phenyl}-1-phenylethylene, 1-{4-[bis(dipropylamino)methylsilyl]phenyl}-1-phenylethylene, 1-{4-[bis(dibutylamino)methylsilyl]phenyl}-1-phenylethylene, 1-{4-[bis(dimethylamino)ethylsilyl]phenyl}-1-phenylethylene, 1-{4-[bis(diethylamino)ethylsilyl]phenyl}-1-phenylethylene, 1-{4-[bis(dipropylamino)ethylsilyl]phenyl}-1-phenylethylene, and 1-{4-[bis(dibutylamino)ethylsilyl]phenyl}-1-phenylethylene.

Examples of the compounds represented by the formula (3) in which $R^{31}$ is a hydrogen atom, $A^1$ is a substituted silyl group, and three of $X^7$, $X^8$, and $X^9$ in the formula (3-Z) are a dialkylamino group can include the following compounds.

Examples of the compounds in which s in the formula (3) is 0 include tris(dimethylamino)vinylsilane, tris(diethylamino)vinylsilane, tris(dipropylamino)vinylsilane, and tris(dibutylamino)vinylsilane.

Examples of the compounds in which s in the formula (3) is 1 include tris(dimethylamino)(4-vinylphenyl)silane, tris(dimethylamino)(3-vinylphenyl)silane, tris(diethylamino)(4-vinylphenyl)silane, tris(diethylamino)(3-vinylphenyl)silane, tris(dipropylamino)(4-vinylphenyl)silane, tris(dipropylamino)(3-vinylphenyl)silane, tris(dibutylamino)(4-vinylphenyl)silane, and tris(dibutylamino)(3-vinylphenyl)silane.

Examples of the compounds represented by the formula (3) in which $R^{31}$ is a methyl group, $A^1$ is a substituted silyl group, and three of $X^7$, $X^8$, and $X^9$ in the formula (3-Z) are a dialkylamino group can include the following compounds.

Examples of the compounds in which s in the formula (3) is 1 include tris(dimethylamino)(4-isopropenylphenyl)silane, tris(dimethylamino)(3-isopropenylphenyl)silane, tris(diethylamino)(4-isopropenylphenyl)silane, tris(diethylamino)(3-isopropenylphenyl)silane, tris(dipropylamino)(4-isopropenylphenyl)silane, tris(dipropylamino) (3-isopropenylphenyl)silane, tris(dibutylamino)(4-isopropenylphenyl)silane, and tris(dibutylamino)(3-isopropenylphenyl)silane.

Examples of the compounds represented by the formula (3) in which $R^{31}$ is a vinyl group, $A^1$ is a substituted silyl group, and three of $X^7$, $X^8$, and $X^9$ in the formula (3-Z) are a dialkylamino group can include the following compounds.

Examples of the compounds in which s in the formula (3) is 0 include tris(dimethylamino)(1-methylene-2-propenyl)silane, tris(diethylamino)(1-methylene-2-propenyl)silane, tris(dipropylamino)(1-methylene-2-propenyl)silane, and tris(dibutylamino)(1-methylene-2-propenyl)silane.

Examples of the compounds represented by the formula (3) in which $R^{31}$ is a phenyl group, $A^1$ is a substituted silyl group, and three of $X^7$, $X^8$, and $X^9$ in the formula (3-Z) is a dialkylamino group can include the following compounds.

Examples of the compounds in which s in the formula (3) is 1 include 1-[4-tris(dimethylamino)silylphenyl]-1-phenylethylene, 1-[4-tris(diethylamino)silylphenyl]-1-phenylethylene, 1-[4-tris(di-n-propylamino)methylsilylphenyl]-1-phenylethylene, and 1-[4-tris(di-n-butylamino)methylsilylphenyl]-1-phenyl ethylene.

The compounds represented by the formula (3) are preferably those in which two of $X^7$, $X^8$, and $X^9$ in the formula (3-Z) are a dialkylamino group, more preferably those in which two of $X^7$, $X^8$, and $X^9$ in the formula (3) are a dialkylamino group, $R^{31}$ is a hydrogen atom, and s is 0.

The compounds represented by the formula (3) in which $A^1$ is a substituted silyl group are most preferably bis(dimethylamino)methylvinylsilane, bis(diethylamino)methylvinylsilane, bis(dipropylamino)methylvinylsilane, bis(dibutylamino)methylvinylsilane, bis(dimethylamino)ethylvinylsilane, bis(diethylamino)ethylvinylsilane, bis(dipropylamino)ethylvinylsilane, and bis(dibutylamino)ethylvinylsilane.

As a modifier having a heteroatom, a compound having a structure represented by the formula (4) can be used. The compound has a functional group reactive with an active terminal of the polymer. By reacting the polymer having an active terminal prepared in step 2 with the compound having a structure represented by the formula (4), a conjugated diene copolymer having units based on the compound having a structure represented by the formula (4) at the terminal can be given.

[Chemical Formula 10]

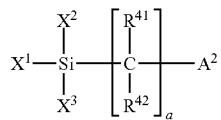

(4)

In the formula (4), $X^1$, $X^2$, and $X^3$ each independently represent a hydrocarbyl group, a hydrocarbyloxy group, a halogen atom, or a functional group reactive with the active terminal of the conjugated diene copolymer, $R^{41}$ and $R^{42}$ each independently represent a hydrogen atom or a hydrocarbyl group, and if a plurality of $R^{41}$ and a plurality of $R^{42}$ are present, these may be the same or different. $A^2$ represents an organic group having at least one atom selected from the group consisting of an oxygen atom, a nitrogen atom, a phosphorus atom, a sulfur atom, and a silicon atom (organic group containing any one or two or more of an oxygen atom, a nitrogen atom, a phosphorus atom, a sulfur atom, and a silicon atom), $A^2$ may have a ring structure, and parts of the structures of $X^1$, $X^2$, and $X^3$ may be bonded to part of $A^2$. In other words, $A^2$ may be bonded to the silicon atom in the formula (4) via $X^1$, $X^2$, and $X^3$. a represents an integer of 0 to 10.

Examples of the hydrocarbyl group for $X^1$, $X^2$, and $X^3$ include alkyl groups, aryl groups, alkenyl groups, and aralkyl groups. The alkyl groups are preferably alkyl groups having 1 to 12 carbon atoms, and examples thereof include a methyl group, an ethyl group, an n-propyl group, an isopropyl group, an n-butyl group, a sec-butyl group, a tert-butyl group, an n-pentyl group, an n-hexyl group, an n-octyl group, an n-dodecyl group, a cyclopentyl group, and a cyclohexyl group. The aryl groups are preferably aryl groups having 6 to 12 carbon atoms, and examples thereof include a phenyl group, a methylphenyl group, an ethylphenyl group, a benzyl group, a tolyl group, and a xylyl group. The alkenyl groups are preferably alkenyl groups having 2 to 12 carbon atoms, and examples thereof include a vinyl group, an allyl group, a 1-propenyl group, and an isopropenyl group. Examples of the aralkyl groups include a benzyl group.

Examples of the hydrocarbyloxy group include alkoxy groups and aryloxy groups. The alkoxy groups are preferably alkoxy groups having 1 to 12 carbon atoms, and examples thereof include a methoxy group, an ethoxy group, an n-propoxy group, an isopropoxy group, an n-butoxy group, a sec-butoxy group, and a tert-butoxy group. The aryloxy groups are preferably aryloxy groups having 6 to 12 carbon atoms, and examples thereof include a phenoxy group and a benzyloxy group. The hydrocarbyloxy group is preferably alkoxy groups, more preferably a methoxy group or an ethoxy group.

Examples of the halogen atom include chlorine, bromine, and iodine atoms.

Examples of the functional group reactive with the active terminal of the conjugated diene copolymer include hydrocarbon groups having an epoxy group and hydrocarbon groups having a carbonyl group.

The hydrocarbyl group for $R^{41}$ and $R^{42}$ is preferably hydrocarbyl groups having 1 to 4 carbon atoms, more preferably alkyl groups having 1 to 4 carbon atoms, still more preferably a methyl group or an ethyl group. If a plurality of $R^{41}$ is present, the plurality of $R^{41}$ may be the same or different, and if a plurality of $R^{42}$ is present, the plurality of $R^{42}$ may be the same or different.

a is preferably 3 or more to enhance fuel efficiency, and preferably 4 or less to enhance the economic efficiency during production.

Examples of $A^2$ as an organic group having at least a nitrogen atom can include a group represented by the formula (4-1).

[Chemical Formula 11]

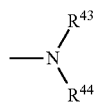

(4-1)

In the formula (4-1), $R^{43}$ and $R^{44}$ each independently represent a hydrocarbyl group optionally having a substituent, a trihydrocarbylsilyl group, or a hydrocarbylene group formed of part of $R^{43}$ bonded to part of $R^{44}$ and optionally having at least one atom selected from the group of atoms consisting of a silicon atom, a nitrogen atom, and an oxygen atom.

Here, the group represented by the formula (4-1) is a non-cyclic amino group if part of $R^{43}$ and part of $R^{44}$ are not bonded, and is a cyclic amino group if $R^{43}$ and $R^{44}$ are bonded.

The hydrocarbyl group optionally having a substituent for $R^{43}$ and $R^{44}$ is a hydrocarbyl group or a substituted hydrocarbyl group.

Examples of the hydrocarbyl group can include alkyl groups having 1 to 12 carbon atoms, such as a methyl group, an ethyl group, an n-propyl group, an isopropyl group, and an n-butyl group; alkenyl groups having 2 to 12 carbon atoms, such as a vinyl group, an allyl group, and an isopropenyl group; and aryl groups having 6 to 12 carbon atoms, such as a phenyl group and a benzyl group, and the hydrocarbyl group is preferably an alkyl group or an aryl group, more preferably a methyl group, an ethyl group, or a benzyl group.

Examples of the substituted hydrocarbyl group can include oxacycloalkyl groups such as an oxiranyl group and a tetrahydrofuranyl group, and preferred is a tetrahydrofuranyl group.

In this specification, the oxacycloalkyl group represents a cycloalkyl group in which $CH_2$ in the alicyclic ring is replaced with an oxygen atom.

Examples of the trihydrocarbylsilyl group for $R^{43}$ and $R^{44}$ can include a trimethylsilyl group and a tert-butyl-dimethylsilyl, and preferred is a trimethylsilyl group.

The hydrocarbylene group formed of part of $R^{43}$ bonded to part of $R^{44}$ and optionally having at least one atom selected from the group of atoms consisting of a silicon atom, a nitrogen atom, and an oxygen atom is a hydrocarbylene group or a hydrocarbylene group having at least one atom selected from the group of atoms consisting of a silicon atom, a nitrogen atom, and an oxygen atom (heteroatom-containing hydrocarbylene group).

Examples of the hydrocarbylene group can include alkylene groups having 2 to 12 carbon atoms, such as a tetramethylene group, a pentamethylene group, a hexamethylene group, and a 2,2,4-trimethylhexane-1,6-diyl group; among these, preferred are alkylene groups having 4 to 7 carbon atoms, and particularly preferred is a pentamethylene group or a hexamethylene group.

Examples of the heteroatom-containing hydrocarbylene group can include silicon atom-containing hydrocarbylene groups, nitrogen atom-containing hydrocarbylene groups, and oxygen atom-containing hydrocarbylene groups.

Examples of the silicon atom-containing hydrocarbylene groups can include a group represented by $-Si(CH_3)_2-CH_2-CH_2-Si(CH_3)_2-$. Examples of the nitrogen atom-containing hydrocarbylene groups can include a group represented by $-CH=N-CH=CH-$ and a group represented by $-CH=N-CH_2-CH_2-$. Examples of the oxygen atom-containing hydrocarbylene groups can include a group represented by $-CH_2-CH_2-O-CH_2-CH_2-$.

Examples of $A^2$ as an organic group having at least an oxygen atom can include a group represented by the formula (4-2).

[Chemical Formula 12]

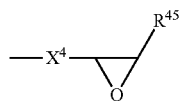
(4-2)

In the formula (4-2), $X^4$ represents a hydrocarbylene group having 1 to 6 carbon atoms and optionally having an oxygen atom, and $R^{45}$ represents a hydrogen atom or a hydrocarbyl group having 1 to 6 carbon atoms.

Examples of the hydrocarbylene group for $X^4$ having 1 to 6 carbon atoms and optionally having an oxygen atom can include unsubstituted hydrocarbylene groups, and hydrocarbylene groups having a group having an oxygen atom as a substituent.

Examples of $X^4$ can specifically include hydrocarbylene groups and hydrocarbyleneoxy groups, more specifically can include an ethylene group, a propylene group, a butylene group, a 1-oxyethylene group, a 1-oxytrimethylene group, and 1-oxytetramethylene group. $X^4$ is preferably a 1-oxytrimethylene group.

Examples of the hydrocarbyl group for $R^{45}$ having 1 to 6 carbon atoms can include alkyl groups and aryl groups, and specifically can include a methyl group, an ethyl group, an n-propyl group, an isopropyl group, an n-butyl group, a sec-butyl group, a t-butyl group, an n-pentyl group, a neopentyl group, an isopentyl group, an n-hexyl group, a cyclohexyl group, and a phenyl group. $R^{45}$ is preferably a hydrogen atom or a methyl group.

Examples of $A^2$ as an organic group having at least a sulfur atom can include a group represented by the formula (4-3).

[Chemical Formula 13]

(4-3)

In the formula (4-3), $R^{40}$ represents a trihydrocarbylsilyl group. Examples of the trihydrocarbylsilyl group can include a trimethylsilyl group, a triethylsilyl group, and a tert-butyl-dimethylsilyl group, and preferred is a trimethylsilyl group or a triethylsilyl group.

Examples of $A^2$ as an organic group having at least a silicon atom can include a group represented by the formula (4-4). In other words, examples of the compound represented by the formula (4) can include polyorganosiloxane compounds having a group represented by the formula (4-4) as $A^2$.

[Chemical Formula 14]

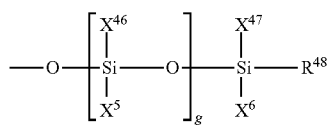
(4-4)

In the formula (4-4), $R^{46}$, $R^{47}$, and $R^{48}$ each independently represent a hydrocarbyl group or a group containing the repeating unit of a hydrocarbyleneoxy group, $X^5$ and $X^6$ each independently represent a hydrocarbyl group, a hydrocarbyloxy group, a group containing the repeating unit of a hydrocarbyleneoxy group, a halogen atom, or a functional group reactive with an active terminal of the conjugated diene copolymer, g represents an integer of 0 to 600, and a plurality of $R^{46}$ and a plurality of $X^5$ present may be the same or different.

Examples of the hydrocarbyl group for $R^{46}$, $R^{47}$, $R^{48}$, $X^5$, and $X^6$ include alkyl groups, aryl groups, and aralkyl groups. The alkyl groups are preferably alkyl groups having 1 to 12 carbon atoms, and examples thereof include a methyl group, an ethyl group, an n-propyl group, an isopropyl group, an n-butyl group, a sec-butyl group, a tert-butyl group, an n-pentyl group, an n-hexyl group, an n-octyl group, an n-dodecyl group, a cyclopentyl group, and a cyclohexyl group. The aryl groups are preferably aryl groups having 6 to 12 carbon atoms, and examples thereof include a phenyl group, a methylphenyl group, an ethylphenyl group, a tolyl group, and a xylyl group. The aralkyl groups are preferably aralkyl groups having 7 to 13 carbon atoms, and examples thereof include a benzyl group.

Examples of the groups having the repeating unit of a hydrocarbyleneoxy group for $R^{46}$, $R^{47}$, $R^{48}$, $X^5$, and $X^6$ include groups having a repeating unit based on alkylene glycol. Examples of the hydrocarbyleneoxy group include a 1-oxyethylene group, a 1-oxytrimethylene group, and a 1-oxytetramethylene group, and preferred is a 1-oxyethylene group.

Examples of the hydrocarbyloxy group for $X^5$ and $X^6$ include alkoxy groups and aryloxy groups. The alkoxy groups are preferably alkoxy groups having 1 to 12 carbon atoms, and examples thereof include a methoxy group, an ethoxy group, an n-propoxy group, an isopropoxy group, an n-butoxy group, a sec-butoxy group, a tert-butoxy group, a pentyloxy group, a hexyloxy group, a heptyloxy group, and an octyloxy group. The aryloxy groups are preferably aryloxy groups having 6 to 12 carbon atoms, and examples thereof include a phenoxy group and a benzyloxy group.

Examples of the halogen atom include chlorine, bromine, and iodine atoms.

Examples of the functional group reactive with the active terminal of the conjugated diene copolymer include a hydrocarbon group having an epoxy group and a hydrocarbon group having a carbonyl group.

g is preferably 3 to 360 from the viewpoint of handling, and preferably 4 to 20 from the viewpoint of fuel efficiency performance.

Among the compounds having a structure represented by the formula (4), examples of a compound in which $A^2$ is a non-cyclic amino group represented by the formula (4-1) can include [3-(dimethylamino)propyl]trimethoxysilane, [3-(diethylamino)propyl]trimethoxysilane, [3-(dimethylamino)propyl]triethoxysilane, [3-(diethylamino)propyl]triethoxysilane, [3-(ethylmethylamino)propyl]trimethoxysilane, [3-(ethylmethylamino)propyl]triethoxysilane, [3-(dimethylamino)propyl]methyldimethoxysilane, [3-(diethylamino)propyl]methyldimethoxysilane, [3-(dimethylamino)propyl]ethyldimethoxysilane, [3-(diethylamino)propyl]ethyldimethoxysilane, [(3-methyl-3-ethylamino)propyl]methyldimethoxysilane, [(3-methyl-3-ethylamino)propyl]ethyldimethoxysilane, [3-(dimethylamino)propyl]methyldiethoxysilane, [3-(diethylamino)propyl]methyldiethoxysilane, [3-(dimethylamino)propyl]ethyldiethoxysilane, [3-(diethylamino)propyl]ethyldiethoxysilane, [3-(ethylmethylamino)propyl]methyldiethoxysilane, [3-(ethylmethylamino)propyl]ethyldiethoxysilane, [3-(benzylmethylamino)propyl]trimethoxysilane, [3-(benzylmethylamino)propyl]triethoxysilane, {3-[di(methoxymethyl)amino]propyl}trimethoxysilane, {3-[di(methoxyethyl)amino]propyl}trimethoxysilane, {3-[di (methoxymethyl)amino]propyl}triethoxysilane, {3-[di(methoxyethyl)amino]propyl}triethoxysilane, {3-[di(ethoxyethyl)amino]propyl}trimethoxysilane, {3-[di(ethoxymethyl)amino]propyl}trimethoxysilane, {3-[di(ethoxyethyl)amino]propyl}triethoxysilane, {3-[di(ethoxymethyl)amino]propyl}triethoxysilane, {3-[N,N-bis(trimethylsilyl)amino]propyl}trimethoxysilane, {3-[N,N-bis(trimethylsilyl)amino]propyl}triethoxysilane, {3-[N,N-bis(t-butyldimethylsilyl)amino]propyl}trimethoxysilane, {3-[N,N-bis(t-butyldimethylsilyl)amino]propyl}triethoxysilane, {3-[N,N-bis(trimethylsilyl)amino]propyl}methyldimethoxysilane, {3-[N,N-bis(trimethylsilyl)amino]propyl}methyldiethoxysilane, {3-[N,N-bis(t-butyldimethylsilyl)amino]propyl}methyldimethoxysilane, {3-[N,N-bis(t-butyldimethylsilyl)amino]propyl}methyldiethoxysilane, [3-(ethylmethylamino)propyl]trimethoxysilane, [3-(ethylmethylamino)propyl]triethoxysilane, [3-(ethylmethylamino)propyl]methyldimethoxysilane, [3-(ethylmethylamino)propyl]ethyldimethoxysilane, [3-(ethylmethylamino)propyl]methyldiethoxysilane, and [3-(ethylmethylamino)propyl]ethyldiethoxysilane.

Among the compounds having a structure represented by the formula (4), to enhance fuel efficiency, the compounds in which $A^2$ is a non-cyclic amino group represented by the formula (4-1) are preferably [3-(dimethylamino)propyl]trimethoxysilane, [3-(diethylamino)propyl]trimethoxysilane, [3-(dimethylamino)propyl]triethoxysilane, or [3-(diethylamino)propyl]triethoxysilane.

Among the compounds having a structure represented by the formula (4), examples of a compound where $A^2$ is a cyclic amino group represented by the formula (4-1) can include 3-morpholinopropyltrimethoxysilane, 3-morpholinopropyltriethoxysilane, 3-morpholinopropylmethyldimethoxysilane, 3-morpholinopropylethyldimethoxysilane, 3-morpholinopropylmethyldiethoxysilane, 3-morpholinopropylethyldiethoxysilane, 3-piperidinopropyltrimethoxysilane, 3-piperidinopropyltriethoxysilane, 3-piperidinopropylmethyldimethoxysilane, 3-piperidinopropylethyldimethoxysilane, 3-piperidinopropylmethyldiethoxysilane, 3-piperidinopropylethyldiethoxysilane, N-(3-trimethoxysilylpropyl)-4,5-dihydroimidazole, N-(3-triethoxysilylpropyl)-4,5-dihydroimidazole, N-(3-trimethoxysilylpropyl)-4,5-imidazole, N-(3-triethoxysilylpropyl)-4,5-imidazole, 3-hexamethyleneiminopropyltrimethoxysilane, 3-hexamethyleneiminopropyltriethoxysilane, 3-hexamethyleneiminopropylmethyldimethoxysilane, 3-hexamethyleneiminopropylethyldimethoxysilane, 3-hexamethyleneiminopropylmethyldiethoxysilane, and 3-hexamethyleneiminopropylethyldiethoxysilane.

Among the compounds having a structure represented by the formula (4), to enhance fuel efficiency, the compound where $A^2$ is a cyclic amino group represented by the formula (4-1) is preferably N-(3-trimethoxysilylpropyl)-4,5-dihydroimidazole, N-(3-triethoxysilylpropyl)-4,5-dihydroimidazole, N-(3-trimethoxysilylpropyl)-4,5-imidazole, or N-(3-triethoxysilylpropyl)-4,5-imidazole.

Among the compounds having a structure represented by the formula (4), examples of a compound where $A^2$ is a group represented by the formula (4-2) can include 3-glycidoxypropyltrimethoxysilane, 3-glycidoxypropyltriethoxysilane, 3-glycidoxypropylmethyldimethoxysilane, 3-glycidoxypropylethyldimethoxysilane, 3-glycidoxypropylmethyldiethoxysilane, and 3-glycidoxypropylethyldiethoxysilane.

Among the compounds having a structure represented by the formula (4), the compound where $A^2$ is a group represented by the formula (4-2) is preferably 3-glycidoxypropyltrimethoxysilane from the viewpoint of enhancement in fuel efficiency, availability of the compound, and enhancement in long-term storage stability.

Among the compounds having a structure represented by the formula (4), examples of a compound where $A^2$ is a group represented by the formula (4-3) include S-trimethylsilylmercaptopropyltrimethoxysilane, S-trimethylsilylmercaptopropyltriethoxysilane, S-trimethylsilylmercaptopropylmethyldimethoxysilane, S-trimethylsilylmercaptopropylmethyldiethoxysilane, S-triethylsilylmercaptopropyltrimethoxysilane, S-triethylsilylmercaptopropyltriethoxysilane, S-triethylsilylmercaptopropylmethyldimethoxysilane, and S-triethylsilylmercaptopropylmethyldiethoxysilane.

Among the compounds having a structure represented by the formula (4), examples of a compound where $A^2$ is a group represented by the formula (4-4) include diglycidoxypolydimethylsiloxane, dimethyl(methoxy-methylsiloxane)polydimethylsiloxane, dimethyl(acetoxy-methylsiloxane)polydimethylsiloxane, diglycidylpolysiloxane, dichloropolydimethylsiloxane, and polysiloxane in which $R^{46}$ is a methyl group and a 3-glycidoxypropyl group, $R^{47}$, $R^{48}$, $X^5$, and $X^6$ are a methyl group, and g is 200.

The modifier having a heteroatom may be a polyorganosiloxane represented by the following formula (10).

[Chemical Formula 15]

$$R^{21}-\underset{\underset{X^{21}}{|}}{\overset{\overset{R^{22}}{|}}{Si}}-O-\left[\underset{\underset{X^{22}}{|}}{\overset{\overset{R^{23}}{|}}{Si}}-O\right]_h-\left[\underset{\underset{X^{23}}{|}}{\overset{\overset{R^{24}}{|}}{Si}}-O\right]_j-\left[\underset{\underset{R^{26}}{|}}{\overset{\overset{R^{25}}{|}}{Si}}-O\right]_k-\underset{\underset{X^{24}}{|}}{\overset{\overset{R^{27}}{|}}{Si}}-R^{28} \quad (10)$$

In the formula (10), $R^{21}$ to $R^{28}$ represent an alkyl group having 1 to 6 carbon atoms or an aryl group having 6 to 12 carbon atoms, and may be the same or different. $X^{21}$ and $X^{24}$ represent any of groups selected from the group consisting of an alkyl group having 1 to 6 carbon atoms, an aryl group having 6 to 12 carbon atoms, an alkoxy group having 1 to 5 carbon atoms, and a group having 4 to 12 carbon atoms and containing an epoxy group, and may be the same or different. $X^{22}$ represents an alkoxy group having 1 to 5 carbon atoms or a group having 4 to 12 carbon atoms and containing an epoxy group, and if a plurality of $X^{22}$ is present, these may be the same or different. $X^{23}$ is a group containing a repeating unit of alkylene glycol having 2 to 20 carbon atoms, and if a plurality of $X^{23}$ is present, these may be the same or different. h represents an integer of 1 to 200, j represents an integer of 0 to 200, k represents an integer of 0 to 200, and h+j+k is 1 or more.

Examples of the alkyl group which has 1 to 6 carbon atoms and can constitute $R^{21}$ to $R^{28}$, $X^{21}$, and $X^{24}$ include a methyl group, an ethyl group, an n-propyl group, an isopropyl group, a butyl group, a pentyl group, a hexyl group, and a cyclohexyl group. Examples of the aryl group having 6 to 12 carbon atoms include a phenyl group and a methylphenyl group. Among these, preferred are a methyl group and an ethyl group from the viewpoint of easiness of production of polyorganosiloxane itself.

Examples of the alkoxy group which has 1 to 5 carbon atoms and can constitute $X^{21}$, $X^{22}$, and $X^{24}$ include a methoxy group, an ethoxy group, a propoxy group, an isopropoxy group, and a butoxy group. Among these, preferred are a methoxy group and an ethoxy group from the viewpoint of easiness of production of polyorganosiloxane itself.

Examples of the group which has 4 to 12 carbon atoms, contains an epoxy group, and can constitute $X^{21}$, $X^{22}$, and $X^{24}$ include a group represented by the following formula (5).

In the formula (5), $Z^1$ represents an alkylene group having 1 to 10 carbon atoms or alkylarylene group, $Z^2$ represents a methylene group, a sulfur atom, or an oxygen atom, and E represents a hydrocarbon group having 2 to 10 carbon atoms and having an epoxy group.

The group represented by the formula (5) is preferably those in which $Z^2$ is an oxygen atom, more preferably those in which $Z^2$ is an oxygen atom and E is a glycidyl group, particularly preferably those in which $Z^1$ is an alkylene group having 1 to 3 carbon atoms, $Z^2$ is an oxygen atom, and E is a glycidyl group.

In the polyorganosiloxane represented by the formula (10), among these, $X^{21}$ and $X^{24}$ are preferably a group having 4 to 12 carbon atoms and containing an epoxy group or an alkyl group having 1 to 6 carbon atoms. $X^{22}$ is preferably a group having 4 to 12 carbon atoms and containing an epoxy group among these. It is more preferred that $X^{21}$ and $X^{24}$ be an alkyl group having 1 to 6 carbon atoms and $X^{22}$ be a group having 4 to 12 carbon atoms and containing an epoxy group.

In the polyorganosiloxane represented by the formula (10), $X^{23}$, that is, a group containing a repeating unit of alkylene glycol having 2 to 20 carbon atoms is preferably a group represented by the following formula (6).

[Chemical Formula 16]

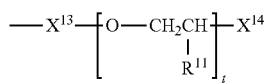

In the formula (6), t represents an integer of 2 to 20, Xn is an alkylene group having 2 to 10 carbon atoms or alkylarylene group, $R^{11}$ represents a hydrogen atom or a methyl group, and $X^{14}$ represents an alkoxy group having 1 to 10 carbon atoms or aryloxy group. Among these, preferred are those in which t is an integer of 2 to 8, $X^{13}$ is an alkylene group having 3 carbon atoms, $R^{11}$ is a hydrogen atom, and $X^{14}$ is a methoxy group.

In the polyorganosiloxane represented by the formula (10), h represents an integer of 1 to 200, preferably 20 to 150, more preferably 30 to 120. If h is 1 to 200, the polyorganosiloxane represented by the formula (10) itself is more easily produced, the viscosity is not significantly high, and handling is easier.

In the polyorganosiloxane represented by the formula (10), j represents an integer of 0 to 200, preferably 0 to 150, more preferably 0 to 120. k represents an integer of 0 to 200, preferably 0 to 150, more preferably 0 to 130. The total number of h, j, and k is 1 or more, preferably 1 to 400, more preferably 20 to 300, particularly preferably 30 to 250. If the total number of h, j, and k is 1 or more, the reaction of the polyorganosiloxane represented by the formula (10) and the conjugated diene polymer chain having an active terminal easily progresses; furthermore, if the total number of h, j, and k is 400 or less, the polyorganosiloxane represented by the formula (10) itself is easily produced, the viscosity is not significantly high, and handling is easier.

To give a conjugated diene copolymer higher processability and durability, the compound having a structure represented by the formula (4) is preferably a compound where $A^2$ is a group represented by the formulas (4-2), (4-3), or (4-4).

Examples of the compound having a structure represented by the formula (4) other than the compounds above can include tris[(alkoxysilyl)alkyl] isocyanurate compounds such as tris[3-(trimethoxysilyl)propyl] isocyanurate, tris[3-(triethoxysilyl)propyl] isocyanurate, tris[3-(tripropoxysilyl) propyl] isocyanurate, and tris[3-(tributoxysilyl)propyl] isocyanurate. Among these, the compound represented by the formula (4) is preferably tris[3-(trialkoxysilyl)propyl] isocyanurate, more preferably tris[3-(trialkoxysilyl)propyl] isocyanurate where the alkoxy group is an alkoxy group having 1 to 4 carbon atoms, still more preferably tris[3-(trimethoxysilyl)propyl] isocyanurate.

Examples of the compound having a structure represented by the formula (4) other than the compounds above include 1,4-bis[3-(trimethoxysilyl)propyl]piperazine, 1,4-bis[3-(triethoxysilyl)propyl]piperazine, bis[3-(trimethoxysilyl)propyl]-N-trimethylsilylamine, bis[3-(triethoxysilyl)propyl]-N-trimethylsilylamine, bis[3-(trimethoxysilyl)propyl] methylamine, bis[3-(triethoxysilyl)propyl]methylamine, bis [3-(trimethoxysilyl)propyl]ethylamine, bis[3-(triethoxysilyl)propyl]ethylamine, tris (trimethoxysilylmethyl)amine, tris(triethoxysilylmethyl) amine, 2,2-dimethoxy-1-(3-trimethoxysilylpropyl)-1-aza-2-silacyclopentane, 2,2-diethoxy-1-(3-triethoxysilylpropyl)-1-aza-2-silacyclopentane, N-[2-(trimethoxysilanyl)-ethyl]-N, N',N'-trim ethyl ethane-1,2-diamine, 2-[3-(trimethoxysilyl) propyl]-1,3-dimethylimidazolidine, and 2-[3-(trimethoxysilyl)propyl]-1,3-(bistrimethylsilyl) imidazolidine.

As the modifier having a heteroatom, a compound having a structure represented by the following formula (5) can also be used. By reacting the conjugated diene copolymer having an active terminal with a compound having the structure represented by the formula (5), a conjugated diene copolymer having units based on the compound having the structure represented by the formula (5) at the terminal can be given.

[Chemical Formula 17]

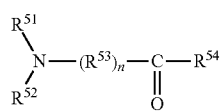

In the formula (5), $R^{51}$ and $R^{52}$ each independently represent a hydrocarbyl group optionally having a substituent, or a hydrocarbylene group formed of part of $R^{51}$ bonded to part of $R^{52}$ and optionally having a nitrogen atom and/or an oxygen atom; $R^{54}$ represents a hydrocarbyl group optionally having a substituent or a hydrogen atom or forms a hydrocarbylene group formed of part of one of $R^{51}$ and $R^{52}$ bonded to part of $R^{54}$ and optionally having a nitrogen atom and/or an oxygen atom. $R^{53}$ represents a divalent group, and n is 0 or 1.

The hydrocarbyl group optionally having a substituent for $R^{51}$, $R^{52}$, and $R^{54}$ is a hydrocarbyl group or a substituted hydrocarbyl group. Examples of the substituted hydrocarbyl group can include hydrocarbyl groups substituted by a hydrocarbyloxy group and hydrocarbyl groups substituted by a substituted amino group.

Examples of the hydrocarbyl group can include alkyl groups, alkenyl groups, alkynyl groups, aryl groups, and aralkyl groups. The alkyl groups are preferably alkyl groups having 1 to 12 carbon atoms, and examples thereof can include a methyl group, an ethyl group, an n-propyl group, an isopropyl group, an n-butyl group, a sec-butyl group, a tert-butyl group, an n-pentyl group, an n-hexyl group, an n-octyl group, an n-dodecyl group, a cyclopentyl group, and a cyclohexyl group. The alkenyl groups are preferably alkenyl groups having 2 to 12 carbon atoms, and examples thereof can include a vinyl group, an allyl group, a 1-propenyl group, and an isopropenyl group. The alkynyl groups are preferably alkynyl groups having 2 to 12 carbon atoms, and examples thereof can include an ethynyl group and a 2-propynyl group. The aryl groups are preferably aryl groups having 6 to 12 carbon atoms, and examples thereof can include a phenyl group, a methylphenyl group, an ethylphenyl group, a benzyl group, a tolyl group, and a xylyl group. The aralkyl groups are preferably aralkyl groups having 7 to 13 carbon atoms, and examples thereof can include a benzyl group.

Examples of the hydrocarbyl group substituted by a hydrocarbyloxy group include alkoxyalkyl groups such as a methoxymethyl group, an ethoxymethyl group, and an ethoxyethyl group.

Examples of the hydrocarbyl group substituted by a substituted amino group can include (N,N-dialkylamino)alkyl groups such as an N,N-dimethylaminomethyl group, a 2-(N,N-dimethylamino)ethyl group, a 2-(N,N-diethylamino)ethyl group, a 3-(N,N-dimethylamino)propyl group, and a 3-(N,N-diethylamino)propyl group; (N,N-dialkylamino)aryl groups such as a 4-(N,N-dimethylamino)phenyl group, a 3-(N,N-dimethylamino)phenyl group, a 4-(N,N-diethylamino)phenyl group, and a 3-(N,N-diethylamino)phenyl group; (N,N-dialkylamino)alkylaryl groups such as a 4-(N,N-dimethylamino)methylphenyl group and a 4-[2-(N,N-dimethylamino)ethyl]phenyl group; alkyl groups substituted by a cyclic amino group, such as a 3-(1-pyrrolidinyl)propyl group, a 3-(1-piperidinyl)propyl group, and a 3-(1-imidazolyl)propyl group; aryl groups substituted by a cyclic amino group, such as a 4-(1-pyrrolidinyl)phenyl group, a 4-(1-piperidinyl)phenyl group, and a 4-(1-imidazolyl)phenyl group; and alkylaryl groups substituted by a cyclic amino group, such as a 4-[2-(1-pyrrolidinyl)ethyl]phenyl group, a 4-[2-(1-piperidinyl)ethyl]phenyl group, and a 4-[2-(1-imidazolyl)ethyl]phenyl group.

In a group formed of part of $R^{51}$ bonded to part of $R^{52}$ or a group formed of part of one of $R^{51}$ and $R^{52}$ bonded to part of $R^{54}$, the hydrocarbylene group optionally having a nitrogen atom and/or an oxygen atom indicates a hydrocarbylene group or hydrocarbylene group having a nitrogen atom and/or an oxygen atom.

Examples of the hydrocarbylene group can include alkylene groups such as a trimethylene group, a tetramethylene group, a pentamethylene group, a hexamethylene group, a 2,2,4-trimethylhexane-1,6-diyl group; and arylene groups such as a 1,4-phenylene group. Examples of the hydrocarbylene group optionally having a nitrogen atom and/or an oxygen atom can include a group represented by —CH═N—CH═CH—, a group represented by —CH═N—CH$_2$—CH$_2$—, and a group represented by —(CH$_2$)$_t$—O—(CH$_2$)$_u$— (where t and u are an integer of 1 or more).

Examples of the divalent group for $R^{53}$ can include a hydrocarbylene group, a hydrocarbylene group having a nitrogen atom and/or an oxygen atom, a group formed of a hydrocarbylene group bonded to an oxygen atom, or a group formed of a hydrocarbylene group bonded to a group represented by —NR$^{55}$— (in which R$^{55}$ represents a hydrocarbyl group or a hydrogen atom).

Examples of the hydrocarbylene group include alkylene groups, alkenediyl groups, arylene groups, and groups formed of an arylene group bonded to an alkylene group (hereinafter, also referred to as arylene-alkylene groups in some cases). Examples of the alkylene groups can include a methylene group, an ethylene group, a propylene group, a tetramethylene group, pentamethylene group, a hexamethylene group, a heptamethylene group, an octamethylene group, and a 2,2,4-trimethylhexane-1,6-diyl group. Examples of the alkenediyl groups can include a pentan-2-ene-1,5-diyl group. Examples of the arylene groups can include a phenylene group, a naphthylene group, and a biphenylene group. Examples of the arylene-alkylene groups can include a phenylene-alkylene group, a naphthylene-alkylene group, and a biphenylene-alkylene group.

Examples of the hydrocarbylene group having a nitrogen atom and/or an oxygen atom can include a group represented by —CH═N—CH═CH—, a group represented by —CH═N—CH$_2$—CH$_2$—, and a group represented by —(CH$_2$)$_t$—O—(CH$_2$)$_u$— (where t and u are an integer of 1 or more). Examples of the group formed of a hydrocarbylene group bonded to an oxygen atom can include a group represented by —(CH$_2$)$_u$—O— (where u is an integer of 1 or more).

Examples of the group formed of a hydrocarbylene group bonded to a group represented by —NR$^{55}$— (in which R$^{55}$ represents a hydrocarbyl group or a hydrogen atom) can include a group represented by —(CH$_2$)v-NR— (in which R represents a hydrocarbyl group having 1 or more and 10 or less carbon atoms or a hydrogen atom, and v is an integer of 1 or more).

The compound represented by the formula (5) is preferably a compound where n is 0 and $R^{54}$ is a hydrocarbyl group optionally having a substituent or a hydrogen atom, i.e., a compound represented by the following formula (5-1); a compound where n is 0 and it represents a group formed of part of $R^{51}$ bonded to part of $R^{54}$, which is a hydrocarbylene group, or a group formed of a hydrocarbylene group bonded to a group represented by —NR$^{55}$— (in which R$^{55}$ represents a hydrocarbyl group or a hydrogen atom), i.e., a compound represented by the following formula (5-2); a compound where n is 1 and $R^{53}$ represents a hydrocarbylene group, i.e., a compound represented by the following formula (5-3); or a compound where n is 1 and $R^{53}$ represents a group formed of a hydrocarbylene group bonded to an oxygen atom or a group formed of a hydrocarbylene group bonded to a group represented by —NR$^{55}$— (in which R$^{55}$ represents a hydrocarbyl group or a hydrogen atom), i.e., a compound represented by the following formula (5-4).

[Chemical Formula 18]

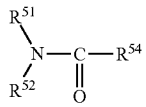

(5-1)

In the formula (5-1), $R^{51}$, $R^{52}$, and $R^{54}$ are as defined as in $R^{51}$, $R^{52}$, and $R^{54}$ in the above formula (5).

[Chemical Formula 19]

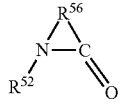

(5-2)

In the formula (5-2), $R^{52}$ is as defined as in $R^{52}$ in the above formula (5). $R^{56}$ represents a hydrocarbylene group or a group formed of a hydrocarbylene group bonded to a group represented by —$NR^{55}$— (in which $R^{55}$ represents a hydrocarbyl group or a hydrogen atom).

[Chemical Formula 20]

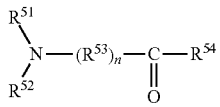

(5-3)

In the formula (5-3), $R^{51}$, $R^{52}$, and $R^{54}$ are as defined as in $R^{51}$, $R^{52}$, and $R^{54}$ in the above formula (5). $R^{53}$ represents a hydrocarbylene group.

[Chemical Formula 21]

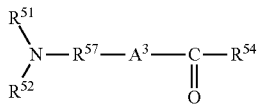

(5-4)

In the formula (5-4), $R^{51}$, $R^{52}$, and $R^{54}$ are as defined as in $R^{51}$, $R^{52}$, and $R^{54}$ in the above formula (5). $R^{57}$ represents a hydrocarbylene group, and $A^3$ represents an oxygen atom or —$NR^{55}$— (in which $R^{55}$ represents a hydrocarbyl group or a hydrogen atom).

$R^{51}$ and $R^{52}$ in the formula (5-1) each independently preferably represent a hydrocarbyl group having 1 or more and 10 or less carbon atoms, a hydrocarbylene group formed of part of $R^{51}$ bonded to part of $R^{52}$ and having 3 or more and 10 or less carbon atoms, or a hydrocarbylene group having 3 or more and 10 or less carbon atoms and having a nitrogen atom, each independently more preferably represent an alkyl group having 1 or more and 10 or less carbon atoms, an aryl group having 6 or more and 10 or less carbon atoms, an alkylene group formed of part of $R^{51}$ bonded to part of $R^{52}$ and having 3 or more and 10 or less carbon atoms, a group represented by —CH=N—CH=CH—, or a group represented by CH=N—$CH_2$—$CH_2$—, each independently still more preferably represent an alkyl group having 1 or more and 6 or less carbon atoms, and each independently further still more preferably represent a methyl group or an ethyl group.

$R^{54}$ for the formula (5-1) preferably represents a hydrocarbyl group or a hydrogen atom, more preferably represents a hydrocarbyl group having 1 or more and 10 or less carbon atoms or a hydrogen atom, still more preferably represents an alkyl group having 1 or more and 6 or less carbon atoms or a hydrogen atom, further still more preferably represents a hydrogen atom, a methyl group, or an ethyl group.

Examples of the compounds represented by the formula (5-1) in which $R^{54}$ represents a hydrocarbyl group can include N,N-dihydrocarbylacetoamides such as N,N-dimethylacetamide, N,N-diethylacetamide, and N-methyl-N-ethylacetoamide; N,N-dihydrocarbylacrylamides such as N-dimethylacrylamide, N,N-diethylacrylamide, and N-methyl-N-ethylacrylamide; and N,N-dihydrocarbylmethacrylamides such as N,N-dimethylmethacrylamide, N,N-diethylmethacrylamide, and N-methyl-N-ethylmethacrylamide.

Examples of the compounds represented by the formula (5-1) in which $R^{54}$ represents a hydrogen atom can include N,N-dihydrocarbylformamides such as N,N-dimethylformamide, N,N-diethylformamide, and N-methyl-N-ethylformamide.

Examples of the hydrocarbylene group for $R^{56}$ in the formula (5-2) include alkylene groups, alkenediyl groups, arylene groups, and groups formed of an arylene group bonded to an alkylene group (hereinafter, also referred to as arylene-alkylene groups in some cases). The alkylene groups are preferably alkylene groups having 1 to 12 carbon atoms, and examples thereof can include a methylene group, an ethylene group, a propylene group, a tetramethylene group, a pentamethylene group, a hexamethylene group, a heptamethylene group, an octamethylene group, and a 2,2,4-trimethylhexane-1,6-diyl group. The alkenediyl groups are preferably alkenediyl groups having 4 to 12 carbon atoms, and examples thereof can include a pentan-2-ene-1,5-diyl group; the arylene groups are preferably arylene groups having 6 to 12 carbon atoms, and examples thereof can include a phenylene group, a naphthylene group, and a biphenylene group. Examples of the arylene-alkylene group can include a phenylene-alkylene group, a naphthylene-alkylene group, and a biphenylene-alkylene group. Examples of the group formed of a hydrocarbylene group for $R^{56}$ bonded to a group represented by —$NR^{55}$-(in which $R^{55}$ represents a hydrocarbyl group or a hydrogen atom) can include a group represented by —$(CH_2)_v$—NR— (in which R represents a hydrocarbyl group having 1 or more and 10 or less carbon atoms or a hydrogen atom, and v is an integer of 1 or more).

$R^{52}$ for the formula (5-2) preferably represents a hydrocarbyl group having 1 or more and 10 or less carbon atoms, more preferably represents an alkyl group having 1 or more and 10 or less carbon atoms or an aryl group having 6 or more and 10 or less carbon atoms, still more preferably represents an alkyl group having 1 or more and 6 or less carbon atoms or a phenyl group, and further still more preferably represents a methyl group, an ethyl group, or a phenyl group.

$R^{56}$ in the formula (5-2) preferably represents a hydrocarbylene group having 1 or more and 10 or less carbon atoms or a group formed of a hydrocarbylene group having 1 or more and 10 or less carbon atoms bonded to a group represented by —$NR^{88}$— (in which $R^{88}$ represents a hydrocarbyl group having 1 or more and 10 or less carbon atoms or a hydrogen atom), more preferably represents an alkylene group having 3 or more and 6 or less carbon atoms or a group represented by —$(CH_2)_w$—NR— (in which R represents a hydrocarbyl group having 1 or more and 10 or less carbon atoms, and w is an integer of 2 or more and 5 or less), and still more preferably represents a trimethylene group, a tetramethylene group, a pentamethylene group, or a group represented by —$(CH_2)_2$—$N(CH_3)$—.

Examples of the compounds represented by the formula (5-2) in which $R^{56}$ represents a hydrocarbylene group can include N-hydrocarbyl-β-propiolactams such as N-methyl-β-propiolactam and N-phenyl-β-propiolactam; N-hydrocarbyl-2-pyrrolidones such as N-methyl-2-pyrrolidone, N-vinyl-2-pyrrolidone, N-phenyl-2-pyrrolidone, N-tert-butyl-2-pyrrolidone, and N-methyl-5-methyl-2-pyrrolidone; N-hydrocarbyl-2-piperidones such as N-methyl-2-piperidone, N-vinyl-2-piperidone, and N-phenyl-2-piperidone; N-hydrocarbyl-ε-caprolactams such as N-methyl-ε-caprolactam and N-phenyl-ε-caprolactam; and N-hydrocarbyl-ω-laurylolactams such as N-methyl-ω-laurylolactam and N-vinyl-ω-laurylolactam. Among these, preferred are N-methyl-2-pyrrolidone, N-phenyl-2-pyrrolidone, N-methyl-ε-caprolactam, and N-phenyl-ε-caprolactam, and more preferred are N-phenyl-2-pyrrolidone and N-methyl-ε-caprolactam.

Examples of the compounds represented by the formula (5-2) in which $R^{56}$ represents a group formed of a hydrocarbylene group bonded to a group represented by —$NR^{55}$— (in which $R^{55}$ represents a hydrocarbyl group or a hydrogen atom) can include 1,3-dihydrocarbyl-2-imidazolidinones such as 1,3-dimethyl-2-imidazolidinone, 1,3-diethyl-2-imidazolidinone, 1,3-divinyl-2-imidazolidinone, and 1-methyl-3-ethyl-2-imidazolidinone. Among these, preferred are 1,3-dimethyl-2-imidazolidinone and 1,3-diethyl-2-imidazolidinone, and more preferred is 1,3-dimethyl-2-imidazolidinone.

$R^{53}$ in the formula (5-3) preferably represents a hydrocarbylene group having 1 or more and 10 or less carbon atoms, more preferably represents an alkylene group having 1 or more and 10 or less carbon atoms or an arylene group having 6 or more and 10 or less carbon atoms, still more preferably represents an alkylene group having 1 or more and 6 or less carbon atoms or a phenylene group, and further still more preferably represents an ethylene group, a trimethylene group, or 1,4-phenylene group.

$R^{54}$ in the formula (5-3) preferably represents a hydrocarbyl group having 1 or more and 10 or less carbon atoms or a hydrocarbyl group having 3 or more and 10 or less carbon atoms and substituted by a dialkylamino group, more preferably represents an alkyl group having 1 or more and 6 or less carbon atoms, an aryl group having 6 or more and 10 or less carbon atoms, a dialkylaminoalkyl group having 3 or more and 6 or less carbon atoms, or a dialkylaminoaryl group having 8 or more and 10 or less carbon atoms, and still more preferably represents a methyl group, an ethyl group, a dialkylaminomethyl group having 3 or more and 6 or less carbon atoms, a dialkylaminoethyl group having 4 or more and 6 or less carbon atoms, a phenyl group, or a dialkylaminophenyl group having 8 or more and 10 or less carbon atoms.

Preferably, $R^{51}$ and $R^{52}$ in the formula (5-3) each independently represent a hydrocarbyl group having 1 or more and 10 or less carbon atoms or a hydrocarbylene group having 3 or more and 10 or less carbon atoms formed of part of $R^{51}$ bonded to part of $R^{52}$, or a hydrocarbylene group having 3 or more and 10 or less carbon atoms and a nitrogen atom; more preferably, $R^{51}$ and $R^{52}$ each independently represents an alkyl group having 1 or more and 10 or less carbon atoms or an aryl group having 6 or more and 10 or less carbon atoms, or a group formed of $R^{51}$ bonded to $R^{52}$ and $R^{51}$ bonded to $R^{52}$ represents an alkylene group having 3 or more and 10 or less carbon atoms, a group represented by —CH=N—CH=CH—, a group represented by —CH=N—CH$_2$—CH$_2$—, or a group represented by —(CH$_2$)$_2$—O—(CH$_2$)$_2$—; still more preferably, $R^{51}$ and $R^{52}$ each independently represent an alkyl group having 1 or more and 6 or less carbon atoms, or an alkylene group having 3 or more and 6 or less carbon atoms, a group represented by —CH=N—CH=CH—, or a group represented by —CH=N—CH$_2$—CH$_2$—, which are formed of part of $R^{51}$ bonded to part of $R^{52}$; further still more preferably, $R^{51}$ and $R^{52}$ each independently represent a methyl group, an ethyl group, or a tetramethylene group, a hexamethylene group, or a group represented by —CH=N—CH=CH—, which are formed of part of $R^{51}$ bonded to part of $R^{52}$.

Examples of the compounds represented by the formula (5-3) in which $R^{53}$ represents an arylene group and $R^{54}$ represents an alkyl group can include 4-(N,N-dihydrocarbylamino)acetophenones such as 4-(N,N-dimethylamino)acetophenone, 4-(N-methyl-N-ethylamino)acetophenone, and 4-(N,N-diethylamino)acetophenone; and 4-cyclic amino acetophenone compounds such as 4'-(imidazol-1-yl)acetophenone. Among these, 4-cyclic amino acetophenone compounds are preferred, and 4'-(imidazole-1-yl)acetophenone is more preferred.

Examples of the compounds represented by the formula (5-3) in which $R^{53}$ represents a hydrocarbylene group and $R^{54}$ represents a hydrocarbyl group or a substituted hydrocarbyl group include bis(dihydrocarbylaminoalkyl)ketones such as 1,7-bis(methylethylamino)-4-heptanone and 1,3-bis(diphenylamino)-2-propanone. Examples of the compounds in which $R^{53}$ represents an arylene group and $R^{54}$ represents an aryl group or a substituted aryl group can include 4-(dihydrocarbylamino)benzophenones such as 4-N,N-dimethylaminobenzophenone, 4-N,N-diethylaminobenzophenone, 4-N,N-di-t-butylaminobenzophenone, and 4-N,N-diphenylaminobenzophenone; and 4,4'-bis(dihydrocarbylamino)benzophenones such as 4,4'-bis(dimethylamino)benzophenone, 4,4'-bis(diethylamino)benzophenone, and 4,4'-bis(diphenylamino)benzophenone. Among these, preferred are 1,7-bis(methylethylamino)-4-heptanone, 4-N,N-dimethylaminobenzophenone, 4-N,N-diethylaminobenzophenone, 4,4'-bis(dimethylamino)benzophenone, and 4,4'-bis(diethylamino)benzophenone, and more preferred are 4-N,N-dimethylaminobenzophenone, 4-N,N-diethylaminobenzophenone, 4,4'-bis(dimethylamino)benzophenone, and 4,4'-bis(diethylamino)benzophenone.

In the formula (5-4), the oxygen atom or $NR^{55}$— (in which $R^{55}$ represents a hydrocarbyl group or a hydrogen atom) for $A^3$ represents preferably an oxygen atom or a group represented by —NR— (in which R represents a hydrocarbylene group having 1 or more and 5 or less carbon atoms or a hydrogen atom), more preferably an oxygen atom or a group represented by —NH—, still more preferably a group represented by —NH—.

Examples of the hydrocarbylene group for $R^{57}$ in the formula (5-4) include alkylene groups, alkenediyl groups, arylene groups, and groups formed of an arylene group bonded to an alkylene group (hereinafter, referred to arylene-alkylene groups in some cases). The alkylene groups are preferably alkylene groups having 1 to 12 carbon atoms, and examples thereof can include a methylene group, an ethylene group, a propylene group, a tetramethylene group, a pentamethylene group, a hexamethylene group, a heptamethylene group, an octamethylene group, and a 2,2,4-trimethylhexane-1,6-diyl group. The alkenediyl groups are preferably alkenediyl groups having 4 to 12 carbon atoms, and examples thereof can include a pentan-2-ene-1,5-diyl group. The arylene groups are preferably arylene groups having 6 to 12 carbon atoms, and examples thereof can include a phenylene group, a naphthylene group, and a biphenylene group. Examples of the arylene-alkylene groups can include a phenylene-alkylene group, a naphthylene-alkylene group, and a biphenylene-alkylene group.

$R^{54}$ in the formula (5-4) represents preferably a hydrocarbyl group having 1 or more and 10 or less carbon atoms, more preferably an alkenyl group having 2 or more and 5 or less carbon atoms, still more preferably a vinyl group or an isopropenyl group, further still more preferably a vinyl group.

$R^{57}$ in the formula (5-4) represents preferably a hydrocarbylene group having 1 or more and 10 or less carbon atoms, more preferably an alkylene group having 1 or more and 6 or less carbon atoms, still more preferably an ethylene group or a trimethylene group, further still more preferably a trimethylene group.

Preferably, $R^{51}$ and $R^{52}$ in the formula (5-4) each independently represent a hydrocarbyl group having 1 or more and 10 or less carbon atoms, a hydrocarbylene group having 3 or more and 10 or less carbon atoms and formed of part of $R^{51}$ bonded to part of $R^{52}$, or a hydrocarbylene group having 3 or more and 10 or less carbon atoms and a nitrogen atom; more preferably, $R^{51}$ and $R^{52}$ each independently represent an alkyl group having 1 or more and 10 or less carbon atoms, an aryl group having 6 or more and 10 or less carbon atoms, an alkylene group having 3 or more and 10 or less carbon atoms and formed of part of $R^{51}$ bonded to part of $R^{52}$, a group represented by —CH=N—CH=CH—, a group represented by —CH=N—CH$_2$—CH$_2$—, or a group represented by —(CH$_2$)$_2$—O—(CH$_2$)$_2$—; still more preferably, $R^{51}$ and $R^{52}$ each independently represent an alkyl group having 1 or more and 6 or less carbon atoms, an alkylene group having 3 or more and 6 or less carbon atoms, a group represented by —CH=N—CH=CH—, or a group represented by —CH=N—CH$_2$—CH$_2$—, which are formed of part of $R^{51}$ bonded to part of $R^{52}$; further still more preferably, $R^{51}$ and $R^{52}$ each independently represent a methyl group, an ethyl group, or a tetramethylene group, a hexamethylene group, or a group represented by —CH=N—CH=CH—, which are formed of part of $R^{51}$ bonded to part of $R^{52}$.

Examples of the compounds represented by the formula (5-4) in which $A^3$ represents an oxygen atom can include 2-(dihydrocarbylamino)ethyl acrylates such as 2-(dimethylamino)ethyl acrylate and 2-(diethylamino)ethyl acrylate; 3-(dihydrocarbylamino)propyl acrylates such as 3-(dimethylamino)propyl acrylate; 2-(dihydrocarbylamino)ethyl methacrylates such as 2-(dimethylamino)ethyl methacrylate and 2-(diethylamino)ethyl methacrylate; and 3-(dihydrocarbylamino)propyl methacrylates such as 3-(dimethylamino) propyl methacrylate. Among these, preferred are 2-(dimethylamino)ethyl acrylate, 3-(dimethylamino)propyl acrylate, 2-(dimethylamino)ethyl methacrylate, and 3-(dimethylamino)propyl methacrylate, and more preferred are 2-(dimethylamino)ethyl acrylate and 3-(dimethylamino)propyl acrylate.

Examples of the compounds represented by the formula (5-4) in which $A^3$ represents a group represented by —NR$^{55}$— (in which R$^{55}$ represents a hydrocarbylene group or a hydrogen atom) can include N-(2-dihydrocarbylaminoethyl)acrylamides such as N-(2-dimethylaminoethyl)acrylamide and N-(2-diethylaminoethyl)acrylamide; N-(3-dihydrocarbylaminopropyl)acrylamides such as N-(3-dimethylaminopropyl)acrylamide, and N-(3-diethylaminopropyl)acrylamide; N-(4-dihydrocarbylaminobutyl)acrylamide s such as N-(4-dimethylaminobutyl)acrylamide and N-(4-diethylaminobutyl)acrylamide; N-(2-dihydrocarbylaminoethyl)methacrylamide s such as N-(2-dimethylaminoethyl)methacrylamide and N-(2-diethylaminoethyl)methacrylamide; N-(3-dihydrocarbylaminopropyl)methacrylamides such as N-(3-dimethylaminopropyl)methacrylamide and N-(3-diethylaminopropyl)methacrylamide; and N-(4-dihydrocarbylaminobutyl)methacrylamides such as N-(4-dimethylaminobutyl)methacrylamide and N-(4-diethylaminobutyl)methacrylamide. Among these, preferred are N-(2-dimethylaminoethyl)acrylamide, N-(3-dimethylaminopropyl)acrylamide, and N-(4-dimethylaminobutyl)acrylamide, and more preferred are N-(2-dimethylaminoethyl)acrylamide and N-(3-dimethylaminopropyl)acrylamide.

The modifier having a heteroatom may be a hydrocarbyloxysilane compound. Although the hydrocarbyloxysilane compound is not particularly limited, a compound represented by the following formula (7) can be suitably used.

[Chemical Formula 22]

(7)

In the formula (7), $R^{12}$ represents a hydrocarbyl group, $R^{13}$ represents a hydrocarbyloxy group, $R^{m}$ represents a group having a nitrogen atom, p represents an integer of 0 to 2, q represents an integer of 1 to 3, r represents an integer of 1 to 3, and p+q+r=4.

Examples of the hydrocarbyl group for $R^{12}$ in the formula (7) include alkyl groups, cycloalkyl groups, alkenyl groups, aryl groups, and aralkyl groups. The hydrocarbyl group may be an alkyl group having 1 to 6 carbon atoms. Examples of the alkyl group having 1 to 6 carbon atoms include a methyl group, an ethyl group, an n-propyl group, an isopropyl group, a butyl group, a pentyl group, and a hexyl group; and among these, a methyl group and an ethyl group are more preferred.

Examples of the hydrocarbyloxy group for $R^{13}$ in the formula (7) include alkoxy groups such as a methoxy group, an ethoxy group, an n-propoxy group, an isopropoxy group, an n-butoxy group, an isobutoxy group, a sec-butoxy group, and a tert-butoxy group; alkenyloxy groups such as a vinyloxy group and an allyloxy group; aryloxy groups such as a phenoxy group and a naphthoxy group; and aralkyloxy groups such as a benzyloxy group. Among these, from the viewpoint of reactivity, preferred are alkoxy groups and aryloxy groups, more preferred are alkoxy groups, and still more preferred are a methoxy group and an ethoxy group.

Although not particularly limited, the group having a nitrogen atom for $R^{14}$ in the formula (7) is preferably an organic group having a nitrogen atom. Examples of the organic group having a nitrogen atom include a 3-aminopropyl group, a 4-aminobutyl group, a 3-(2-aminoethylamino)propyl group, a 2-dimethylaminoethyl group, a 3-dimethylaminopropyl group, a 3-diethylaminopropyl group, a 3-dipropylaminopropyl group, a 3-dibutylaminopropyl group, a 3-phenylmethylaminopropyl group, a 3-(4-methylpiperazinyl)propyl group, a N,N-bis(trimethylsilyl)aminopropyl group, a N,N-bis(triethylsilyl)aminopropyl group, and an N,N',N'-tris(trimethylsilyl)-N-(2-aminoethyl)-3-aminopropyl group. Among these, preferred are primary amino groups having an active hydrogen atom and/or secondary amino groups having an active hydrogen atom, such as a 3-aminopropyl group, a 4-aminobutyl group, a 3-(2-aminoethylamino)propyl group because the low heat buildup of the resulting cross-linked rubber and the wet grip properties thereof can be further enhanced. The "active hydrogen atom" indicates a hydrogen atom bonded to an atom other than a carbon atom, and is preferably those having lower binding energy than those of the carbon-hydrogen bond of the polymethylene chain.

In the compound represented by the formula (7), preferably, p is 0 or 1, q is 2 or 3, and r is 1 or 2, and more preferably, p is 0, q is 3, and r is 1 from the viewpoint of the reactivity with the reaction residue generated from a reaction of the conjugated diene polymer chain having an active terminal or the conjugated diene polymer chain having an active terminal with a siloxane compound. If p is 2, two groups represented by $R^{12}$ and contained in one molecule of the compound represented by the formula (7) may be the same or different. If q is 2 or 3, a plurality of groups represented by $R^{13}$ contained in one molecule of the compound represented by the formula (7) may be the same or different. If r is 2 or 3, a plurality of groups represented by $R^{14}$ contained in one molecule of the compound represented by the formula (7) may be the same or different.

Examples of the compound in which $R^{14}$ in the formula (7) has a primary amino group having an active hydrogen atom and/or a secondary amino group having an active hydrogen atom include compounds having a 3-aminopropyl group as $R^{14}$ such as 3-aminopropyldimethylmethoxysilane, 3-aminopropylmethyldimethoxysilane, 3-aminopropyltrimethoxysilane, 3-aminopropyldimethylethoxysilane, 3-aminopropylmethyldiethoxysilane, and 3-aminopropyltriethoxysilane; compounds having a 4-aminobutyl group as $R^{14}$ such as 4-aminobutyldimethylmethoxysilane, 4-aminobutylmethyldimethoxysilane, 4-aminobutyltrimethoxysilane, 4-aminobutyldimethylethoxysilane, 4-aminobutylmethyldiethoxysilane, and 4-aminobutyltriethoxysilane; and compounds having a 3-(2-aminoethylamino)propyl group for $R^{14}$ such as 3-(2-aminoethylamino)propyldimethylmethoxysilane, 3-(2-aminoethylamino)propylmethyldimethoxysilane, 3-(2-aminoethylamino)propyltrimethoxysilane, 3-(2-aminoethylamino)propyldimethylethoxysilane, 3-(2-aminoethylamino)propylmethyldiethoxysilane, and 3-(2-aminoethylamino)propyltriethoxysilane.

Examples of compounds in which $R^{14}$ in the formula (7) is a group other than groups containing a primary amino group having an active hydrogen atom and/or a secondary amino group having an active hydrogen atom include compounds having a 3-dimethylaminopropyl group as $R^{14}$ such as 3-dimethylaminopropyltrimethoxysilane, 3-dimethylaminopropylmethyldimethoxysilane, 3-dimethylaminopropyldimethylmethoxysilane, 3-dimethylaminopropyltriethoxysilane, 3-dimethylaminopropylmethyldiethoxysilane, and 3-dimethylaminopropyldimethylethoxysilane; compounds having a 3-diethylaminopropyl group as $R^{14}$ such as 3-diethylaminopropyltrimethoxysilane, 3-diethylaminopropylmethyldimethoxysilane, 3-diethylaminopropyldimethylmethoxysilane, 3-diethylaminopropyltriethoxysilane, 3-diethylaminopropylmethyldiethoxysilane, and 3-diethylaminopropyldimethylethoxysilane; compounds having a 3-dipropylaminopropyl group as $R^{14}$ such as 3-dipropylaminopropyltrimethoxysilane, 3-dipropylaminopropylmethyldimethoxysilane, 3-dipropylaminopropyldimethylmethoxysilane, 3-dipropylaminopropyltriethoxysilane, 3-dipropylaminopropylmethyldiethoxysilane, and 3-dipropylaminopropyldimethylethoxysilane; compounds having a 3-dibutylaminopropyl group as $R^{14}$ such as 3-dibutylaminopropyltrimethoxysilane, 3-dibutylaminopropylmethyldimethoxysilane, 3-dibutylaminopropyldimethylmethoxysilane, 3-dibutylaminopropyltriethoxysilane, 3-dibutylaminopropylmethyldiethoxysilane, and 3-dibutylaminopropyldimethylethoxysilane; compounds having a 3-phenylmethylaminopropyl group as $R^{14}$ such as 3-phenylmethylaminopropyltrimethoxysilane, 3-phenylmethylaminopropylmethyldimethoxysilane, 3-phenylmethylaminopropyldimethylmethoxysilane, 3-phenylmethylaminopropyltriethoxysilane, 3-phenylmethylaminopropylmethyldiethoxysilane, and 3-phenylmethylaminopropyldimethylethoxysilane; compounds having a 3-(4-methylpiperazinyl)propyl group as $R^{14}$ such as 3-(4-methylpiperazinyl)propyltrimethoxysilane, 3-(4-methylpiperazinyl)propylmethyldimethoxysilane, 3-(4-methylpiperazinyl)propyldimethylmethoxysilane, 3-(4-methylpiperazinyl)propyltriethoxysilane, 3-(4-methylpiperazinyl)propylmethyldiethoxysilane, and 3-(4-methylpiperazinyl)propyldimethylethoxysilane; compounds having an N,N-bis(trimethylsilyl)aminopropyl group as $R^{14}$ such as N,N-bis(trimethylsilyl)aminopropyltrimethoxysilane, N,N-bis(trimethylsilyl)aminopropyltriethoxysilane, N,N-bis(trimethylsilyl)aminopropylmethyldimethoxysilane, and N,N-bis(trimethylsilyl)aminopropylmethyldiethoxysilane; compounds having an N,N-bis(triethylsilyl)aminopropyl group as $R^{14}$ such as N,N-bis(triethylsilyl)aminopropyltrimethoxysilane, N,N-bis(trimethylsilyl)aminopropyltriethoxysilane, N,N-bis(triethylsilyl)aminopropylmethyldimethoxysilane, and N,N-bis(triethylsilyl)aminopropylmethyldiethoxysilane; and compounds having a N,N',N'-tris(trimethylsilyl)-N-(2-aminoethyl)-3-aminopropyl group as $R^{14}$ such as N,N',N'-tris(trimethylsilyl)-N-(2-aminoethyl)-3-aminopropyltrimethoxysilane, N,N',N'-tris(trimethylsilyl)-N-(2-aminoethyl)-3-aminopropyltriethoxysilane, N,N',N'-tris(trimethylsilyl)-N-(2-aminoethyl)-3-aminopropylmethyldimethoxysilane, and N,N',N'-tris(trimethylsilyl)-N-(2-aminoethyl)-3-aminopropylmethyldiethoxysilane.

To enhance tensile strength at break and resistance to wear, the weight average molecular weight (Mw) of the conjugated diene copolymer is preferably 30,000 or more, more preferably 80,000 to 3,000,000, still more preferably 100,000 to 1,500,000.

To enhance tensile strength at break and resistance to wear, the Mooney viscosity ($ML_{1+4}$) of the conjugated diene copolymer is preferably 10 or more, more preferably 20 or more, still more preferably 30 or more. To enhance processability, the Mooney viscosity of the conjugated diene copolymer is preferably 100 or less, more preferably 90 or less, still more preferably 80 or less. The Mooney viscosity ($ML_{1+4}$) is measured at 100° C. according to HS K6300-1 (2013).

To enhance fuel efficiency performance, the vinyl bond amount in the conjugated diene copolymer is preferably 80 mol % or less, more preferably 70 mol % or less, still more preferably 60 mol % or less where the content of monomer units derived from the conjugated diene compound is 100 mol %. To enhance wet grip performance, the vinyl bond amount of the conjugated diene copolymer is preferably 30 mol % or more, more preferably 40 mol % or more, still more preferably 50 mol % or more where the content of monomer units derived from the conjugated diene compound is 100 mol %. The vinyl bond amount is determined by infrared spectroscopy from the absorption intensity around 910 $cm^{-1}$, which is the absorption peak of the vinyl group.

The conjugated diene copolymer according to the present embodiment comprises a first step of polymerizing a monomer containing a conjugated diene compound in a hydrocarbon solvent in the presence of a polymerization initiator to yield a conjugated diene copolymer having an active terminal, and a second step of reacting the conjugated diene copolymer having an active terminal with a compound having a covalent bond reversibly dissociated and added by heat to yield a conjugated diene copolymer having a dynamic covalent bond.

As the polymerization initiator, an alkali metal, an organic alkali metal compound, a complex of an alkali metal with a polar compound, an oligomer having an alkali metal, or the like can be used.

Examples of the alkali metal include lithium, sodium, potassium, rubidium, and cesium. Examples of the organic alkali metal compound include ethyllithium, n-propyllithium, iso-propyllithium, n-butyllithium, sec-butyllithium, t-octyllithium, n-decyllithium, phenyllithium, 2-naphthyllithium, 2-butylphenyllithium, 4-phenylbutyllithium, cyclohexyllithium, 4-cyclopentyllithium, dimethylaminopropyllithium, diethylaminopropyllithium, t-butyldimethylsilyloxypropyllithium, N-morpholinopropyllithium, lithium hexamethylene imide, lithium pyrrolidide, lithium piperidide, lithium heptamethylene imide, lithium dodecamethylene imide, 1,4-dilithio-2-butene, sodium naphthalenide, sodium biphenylide, and potassium naphthalenide. Examples of the complex of an alkali metal and a polar compound include a potassium-tetrahydrofuran complex and a potassium-diethoxyethane complex. Examples of the oligomer having an alkali metal include compounds yielded by reacting isoprene with 3-(dimethylamino)propyllithium or 3-(diethylamino)propyllithium and sodium salts of α-methylstyrene tetramer. Among these, preferred as the polymerization initiator are organic lithium compounds and organic sodium compounds, and more preferred are organic lithium compounds and organic sodium compounds having 2 to 20 carbon atoms. These polymerization initiators may be used alone or in combination of two or more thereof.

As the polymerization initiator, a conjugated diene polymer having an active terminal may be used. The conjugated diene polymer having an active terminal can be yielded by reacting a polymerization initiator with a monomer containing a conjugated diene compound. As the polymerization initiator, those similar to the compounds described above can be used. Although the monomer used in the conjugated diene polymer having an active terminal is not particularly limited, the conjugated diene compound, the aromatic vinyl compound, or the compound copolymerizable with the conjugated diene compound can be used. Preferably, the conjugated diene polymer having an active terminal contains only isoprene or isoprene and an aromatic vinyl compound as monomer units.

The amount of the polymerization initiator to be used is preferably 0.01 mmol to 15 mmol relative to 100 g of the total amount of the aromatic vinyl compound and the conjugated diene compound.

The hydrocarbon solvent is a solvent which does not deactivate the polymerization initiator, and aliphatic hydrocarbons, aromatic hydrocarbons, alicyclic hydrocarbons, and the like can be used. Examples of the aliphatic hydrocarbons include propane, n-butane, iso-butane, n-pentane, iso-pentane, 2-methylpentane, 3-methylpentane, n-hexane, propene, 1-butene, iso-butene, trans-2-butene, cis-2-butene, 1-pentene, 2-pentene, 1-hexene, and 2-hexene. Examples of the aromatic hydrocarbons include benzene, toluene, xylene, and ethylbenzene. Examples of the alicyclic hydrocarbons include cyclopentane, methylcyclopentane, and cyclohexane. Among these, preferred are hydrocarbons having 2 to 12 carbon atoms. These hydrocarbon solvents may be used alone or in combination of two or more thereof, or a mixture of an aliphatic hydrocarbon and an alicyclic hydrocarbon, such as hexane for an industrial use may be used.

In the first step, the monomer containing a conjugated diene compound can be polymerized to yield a diene copolymer having an active terminal, which is derived from the polymerization initiator. To enhance mechanical strength, the monomer may further contain an aromatic vinyl compound.

The polymerization in the first step may be performed in the presence of an agent of adjusting the vinyl bond amount in conjugated diene units or an agent of adjusting the distribution of conjugated diene units and monomer units other than conjugated diene in conjugated diene copolymer chains (hereinafter, collectively referred to as "adjuster"). As the adjuster, ether compounds, tertiary amines, phosphine compounds, alkali metal alkoxides, alkali metal phenoxides, and the like can be used.

Examples of the ether compounds include cyclic ethers such as tetrahydrofuran, tetrahydropyran, and 1,4-dioxane; aliphatic monoethers such as diethyl ether and dibutyl ether; aliphatic diethers such as ethylene glycol dimethyl ether, ethylene glycol diethyl ether, and ethylene glycol dibutyl ether; aliphatic triethers such as diethylene glycol diethyl ether and adiethylene glycol dibutyl ether; and aromatic ethers such as diphenyl ether, anisole, 1,2-dimethoxybenzene, and 3,4-dimethoxytoluene. Examples of the tertiary amines include triethylamine, tripropylamine, tributylamine, 1,1,2,2-tetramethylethylenediamine, N,N-diethyl aniline, pyridine, and quinoline. Examples of the phosphine compounds include trimethylphosphine, triethylphosphine, and triphenylphosphine. Examples of the alkali metal alkoxides include sodium-tert-butoxide, potassium-tert-butoxide, sodium-tert-pentoxide, and potassium-tert-pentoxide. Examples of the alkali metal phenoxides include sodium phenoxide and potassium phenoxide. These adjusters may be used alone or in combination of two or more thereof.

The polymerization temperature of the first step is usually 25 to 100° C., preferably 35 to 90° C., more preferably 50 to 80° C. The polymerization time is usually 10 minutes to 5 hours.

In the second step, using the compound having a dynamic covalent bond as a coupling agent, the dynamic covalent bond is introduced to the conjugated diene copolymer yielded in the first step. As the compound having a dynamic covalent bond, the compound represented by the formula (2) can be used.

In the second step, the temperature at which the copolymer yielded in the second step is reacted with the compound represented by the formula (2) is usually 25 to 100° C., preferably 35 to 90° C., more preferably 50 to 80° C. The reaction time is usually 1 minute to 1 hour, preferably 5 minutes to 1 hour, more preferably 10 minutes to 30 minutes.

The manufacturing method according to the present embodiment may further comprise a third step of reacting the conjugated diene copolymer having an active terminal with the modifier containing a heteroatom to introduce units based on the modifier to the conjugated diene copolymer.

The third step may be performed during the first step or before or after the second step. For example, in the first step, the modifier containing a heteroatom may be added to perform copolymerization when the conjugated diene copolymer having an active terminal is yielded.

The conjugated diene copolymer can be recovered from a hydrocarbon solution of the conjugated diene copolymer by a known recover method, such as a method of adding a solidifying agent to a hydrocarbon solution of the conjugated diene copolymer or a method of adding steam to the hydrocarbon solution of the conjugated diene copolymer. The recovered conjugated diene copolymer may be dried by a known dryer such as a hand dryer or an extrusion-type dryer.

[Polymer Composition]

A polymer composition may be prepared by compounding a reinforcing material, other polymer components, additives, and the like with the conjugated diene copolymer according to the present embodiment. The conjugated diene copolymer according to the present embodiment has a good balance between kneading processability and mechanical strength.

Examples of the reinforcing material include silica, calcium silicate, aluminum silicate, aluminum hydroxide, and carbon black. These reinforcing materials may be used alone or in combination of two or more thereof.

Examples of the silica include dry silica (anhydrous silicic acid), wet silica (hydrous silicic acid), colloidal silica, and precipitated silica. The BET specific surface area of the silica is preferably 50 $m^2/g$ to 250 $m^2/g$. The BET specific surface area is measured according to ASTM D1993-03. As commercial products of the silica, a trade name "ULTRASIL VN3-G" manufactured by Evonik Industries AG, trade names "VN3", "AQ", "ER", and "RS-150" manufactured by TOSOH SILICA CORPORATION, trade names "Zeosil 1115MP" and "Zeosil 1165MP" manufactured by Solvay S.A., and the like can be used. These silicas may be used alone or in combination of two or more thereof.

Examples of carbon black include furnace black, acetylene black, thermal black, channel black, and graphite. Examples of the channel black include EPC, MPC, and CC. Examples of furnace carbon black include SAF, ISAF, HAF, MAF, FEF, SRF, GPF, APF, FF, CF, SCF, and ECF. Examples of the thermal black include FT and MT. These carbon black materials may be used alone or in combination of two or more thereof.

The nitrogen adsorption specific surface area ($N_2SA$) of the carbon black is preferably 5 $m^2/g$ to 200 $m^2/g$. The dibutyl phthalate (DBP) absorption amount of the carbon black is preferably 5 mL/100 g to 300 mL/100 g. The nitrogen adsorption specific surface area can be measured according to ASTM D4820-93, and the DBP absorption amount can be measured according to ASTM D2414-93. As commercial products of the carbon black, a trade name "DIABLACK N339" manufactured by Mitsubishi Chemical Corporation, a trade name "SEAST 6", "SEAST 7HM", and "SEAST KH" manufactured by Tokai Carbon Co., Ltd., trade names "CK3" and "Special Black 4A" manufactured by Orion Engineered Carbons S.A., and the like can be used.

To enhance wet grip performance, the content of the reinforcing material in the polymer composition is 10 parts by mass or more, preferably 20 parts by mass or more, more preferably 30 parts by mass or more relative to 100 parts by mass of the conjugated diene copolymer. To enhance reinforcing properties, the content of the reinforcing material is 150 parts by mass or less, preferably 120 parts by mass or less, more preferably 100 parts by mass or less.

Examples of the other polymer components include polybutadiene rubber, butadiene-isoprene copolymer rubber, butyl rubber, natural rubber, ethylene-propylene copolymers, and ethylene-octene copolymers. These polymer components may be used alone or in combination of two or more thereof.

As the additives, known additives can be used; and examples thereof can include vulcanizing agents such as sulfur; vulcanization accelerators such as thiazole-based vulcanization accelerators, thiuram-based vulcanization accelerators, sulfenamide-based vulcanization accelerators, and guanidine-based vulcanization accelerators; vulcanization activators such as stearic acid and zinc oxide; organic peroxides; silane coupling agents; extender oils; processing aids;

antioxidants; and lubricants.

Examples of the silane coupling agent include vinyltrichlorosilane, vinyltriethoxysilane, vinyltris(β-methoxyethoxy)silane, β-(3,4-epoxycyclohexyl)ethyltrimethoxysilane, γ-glycidoxypropyltrimethoxysilane, γ-methacryloxypropyltrimethoxysilane, N-(β-aminoethyl)-γ-aminopropyltrimethoxysilane, N-(β-aminoethyl)-γ-aminopropylmethyldimethoxysilane, N-phenyl-γ-aminopropyltrimethoxysilane, γ-chloropropyltrimethoxysilane, γ-mercaptopropyltrimethoxysilane, γ-aminopropyltriethoxysilane, bis(3-(triethoxysilyl)propyl) disulfide, bis(3-(triethoxysilyl)propyl) tetrasulfide, γ-trimethoxysilylpropyldimethylthiocarbamyl tetrasulfide, and γ-trimethoxysilylpropylbenzothiazyl tetrasulfide. These silane coupling agents may be used alone or in combination of two or more thereof. As commercial products, trade names "Si69", "Si75", and "Si266" manufactured by Evonik Industries AG, trade names "NXT Silane", "NXT-Z30", "NXT-Z45", "NXT-Z60", and "NXT-Z100" manufactured by Momentive Performance Materials, and the like can be used.

The compounding amount of the silane coupling agent is preferably 1 to 20 parts by mass, more preferably 2 to 15 parts by mass, still more preferably 5 to 10 parts by mass relative to 100 parts by mass of the reinforcing material.

Examples of the extender oils include aromatic mineral oils (viscosity gravity constant (V.G.C. value: 0.900 to 1.049), naphthene-based mineral oils (V.G.C. value: 0.850 to 0.899) and paraffin-based mineral oils (V.G.C. value: 0.790 to 0.849). The polycyclic aromatic content of the extender oil is preferably less than 3% by mass, more preferably less than 1% by mass. The polycyclic aromatic content is measured by the 346/92 method specified by the Institute of Petroleum in UK. The aromatic compound content (CA) of the extender oil is preferably 20% by mass or more. These extender oils may be used alone or in combination of two or more thereof.

Examples of the vulcanization accelerators include thiazole-based vulcanization accelerators such as 2-mercaptobenzothiazole, dibenzothiazyl disulfide, and N-cyclohexyl-2-benzothiazylsulfenamide; thiuram-based vulcanization accelerators such as tetramethylthiuram monosulfide and tetramethylthiuram disulfide; sulfenamide-based vulcanization accelerators such as N-cyclohexyl-2-benzothiazolesulfenamide, N-t-butyl-2-benzothiazolesulfenamide, N-oxyethylene-2-benzothiazolesulfenamide, N-oxyethylene-2-benzothiazolesulfenamide, and N,N'-diisopropyl-2-benzothiazolesulfenamide; and guanidine-based vulcanization accelerators such as diphenylguanidine, diorthotolylguanidine, and orthotolylbiguanidine. These vulcanization accelerators may be used alone or in combination of two or more thereof.

The compounding amount of the vulcanization accelerator is preferably 0.1 to 5 parts by mass, more preferably 0.2 to 3 parts by mass relative to 100 parts by mass of the polymer component.

As the method of producing the polymer composition according to the present embodiment, a known method, such as a method of kneading the components with a known mixer such as a roll or a Banbury mixer may be used.

For the kneading conditions, if the additives other than the vulcanizing agent and the vulcanization accelerator are compounded, the kneading temperature is usually 50 to 200° C., preferably 80 to 190° C., and the kneading time is usually 30 seconds to 30 minutes, preferably 1 minute to 30 minutes. If the vulcanizing agent and the vulcanization accelerator are compounded, the kneading temperature is usually 100° C. or less, preferably room temperature to 80° C. The composition with which the vulcanizing agent and the vulcanization accelerator are compounded is usually used after subjected to a vulcanization treatment such as press vulcanization. The vulcanization temperature is usually 120 to 200° C., preferably 140 to 180° C.

The polymer composition according to the present embodiment has high mechanical strength, and is suitably used in motor vehicle tires.

EXAMPLES

The present invention will be described in more detail by way of Examples below, but the present invention is not limited to these Examples.

Evaluations of physical properties were performed by the following method.
1. Mooney Viscosity ($ML_{1+4}$)

The initial Mooney viscosity of the conjugated diene copolymer was measured at 100° C. according to JIS K6300-1 (2013).
2. Vinyl Bond Amount (Unit: Mol %)

The vinyl bond amount of conjugated diene in the polymer was determined by infrared spectroscopy from the absorption intensity around 910 cm$^{-1}$, which is the absorption peak of the vinyl group.
3. Monomer Units Content Derived from Styrene (Unit: % by Mass)

The monomer units content derived from styrene in the conjugated diene copolymer was determined from the refractive index according to JIS K6383(2001).
4. Weight Average Molecular Weight (Mw)

The Mw of the conjugated diene copolymer was determined from the curve of the molecular weight distribution obtained from GPC measurement under the following conditions (1) to (8).
  (1) apparatus: available from Tosoh Corporation, HLC-8321GPC/HT
  (2) separation column: three columns available from Tosoh Corporation, TSKgel GMHHR-H(S)HT 7.8 mm I.D.×300 mm
  (3) temperature for measurement: 40° C.
  (4) carrier: ortho-dichlorobenzene (containing 0.1 wt/V BHT)
  (5) flow rate: 1 mL/min
  (6) injection amount: 300 μL
  (7) detector: differential refractive
  (8) molecular weight standard: standard polystyrene manufactured by Tosoh Corporation
5. Area Change Rate The temperature for measurement was changed to 60° C., and GPC measurement was performed to obtain the curve of the molecular weight distribution (GPC chart). The peak proportion of the area on the lowest molecular weight side was calculated, in which the total area of the molecular weight distribution curve was 100, and the area change rate was calculated according to the following expression.

area change rate (%)=[(peak proportion of area on the lowest molecular weight side at 60° C.)−(peak proportion of area on the lowest molecular weight side at 40° C.)]÷(peak proportion of area on the lowest molecular weight side at 40° C.)×100

6. Compound Mooney Viscosity ($ML_{1+4}$)

The Mooney viscosity of the polymer composition was measured at 100° C. according to JIS K6300-1 (2013). As the Mooney viscosity of the compound is smaller, the processability is higher.
7. Tensile Strength at Break (Unit: MPa)

A #3 dumbbell test piece was punched out from a vulcanized sheet, and was fed to a test. According to JIS K6251, the stress when the test piece broke (tensile strength at break) was measured at 23° C. using the #3 dumbbell test piece at a tensile rate of 500 mm/min. The tensile strength at break shown in Table 1 is a relative value relative to 100 of the value in Comparative Example 1, and the tensile strength at break shown in Table 2 is a relative value relative to 100 of the value in Comparative Example 3. As the numeric value is larger, the strength is higher.
8. Resistance to Wear (Unit: Mg/1000 Rotations)

An annular vulcanized sheet was used as a test piece, and the wear amounts from 500 rotations to 1500 rotations, from 1500 rotations to 2500 rotations, and from 2500 rotations to 3500 rotations were measured with an Akron wear tester (Ueshima Seisakusho Co., Ltd.) under the conditions at a load of 10 pounds and the number of rotations of the test piece of 300 rpm, and the average of the wear amounts was calculated. The resistance to wear shown in Table 1 is the relative value relative to 100 of the value in Comparative Example 1, and the resistance to wear shown in Table 2 is the relative value relative to 100 of the value in Comparative Example 3. As the numeric value is larger, the resistance to wear is higher.
9. Grip Properties A strip-like test piece having a width of 1 mm or 2 mm and a length of 40 mm was punched out from a vulcanized sheet, and was fed to a test. In the measurement, the loss tangent (tan δ (0° C.)) of the temperature of 0° C. was measured at test piece with a rheometer (manufactured by Ueshima Seisakusho Co., Ltd.) under the conditions at a strain of 2.5% and a frequency of 10 Hz. The grip properties shown in Table 1 are the relative value relative to 100 of the value in Comparative Example 1, and the grip properties shown in Table 2 are the relative value relative to 100 of the value in Comparative Example 3. As the numeric value is larger, the grip properties are higher.
10. Fuel Efficiency A strip-like test piece having a width of 1 mm or 2 mm and a length of 40 mm was punched out from a vulcanized sheet, and was fed to a test. In the measurement, the loss tangent (tan δ (70° C.)) of the test piece at a temperature of 70° C. was measured with a rheometer (manufactured by Ueshima Seisakusho Co., Ltd.) under the conditions at a strain of 1% and a frequency of 10 Hz. The fuel efficiency shown in Table 1 is the relative value relative to 100 of the value in Comparative Example 1, and the fuel efficiency shown in Table 2 is the relative value relative to 100 of the value in Comparative Example 3. As the numeric value is smaller, the fuel efficiency is higher.

<Preparation of Conjugated Diene Copolymer>

Example 1

A polymerization reactor made of stainless steel, having an inner volume of 20 L, and provided with a stirrer was washed and dried, and the atmosphere inside the polymerization reactor was purged with nitrogen. Next, 10.2 kg of hexane for industrial use (manufactured by Sumitomo Chemical Co., Ltd., a trade name "hexane (general good)", density: 0.68 g/mL), 420 g of 1,3-butadiene, 140 g of styrene, 4.25 mL of tetrahydrofuran, and 2.97 mL of ethylene glycol diethyl ether were placed into a polymerization reaction vessel. Next, a small amount of a hexane solution of n-BuLi as a scavenger was placed into the polymerization reactor, and an n-hexane solution containing 9.62 mmol of n-BuLi was placed to start polymerization.

Copolymerization of 1,3-butadiene and styrene was performed for 2.0 hours. During the polymerization, the stirring rate was controlled to 130 rpm, the temperature inside the polymerization reaction was controlled to 65° C., and 630 g of 1,3-butadiene and 210 g of styrene were continuously fed into the polymerization reaction vessel. Subsequently, while the temperature was being kept at 65° C., the resulting polymerization solution was stirred in the polymerization reactor at a stirring rate of 130 rpm, and 4.51 mmol of bis(4-glycidyloxy-2,2,6,6-tetramethylpiperidin-1-yl) disulfide (hereinafter, abbreviated to "BiTEMPS-Gli") as a coupling agent was added to the polymerization solution, followed by stirring for 15 minutes. Subsequently, 5 mL of a hexane solution containing 0.5 mL of methanol was placed into the polymerization reactor, and the polymerization solution was stirred for 5 minutes.

8.0 g of 2-tert-butyl-6-β-tert-butyl-2-hydroxy-5-methylbenzyl)-4-methylphenylacrylate (manufactured by Sumitomo Chemical Co., Ltd., trade name: Sumilizer GM) and 4.0 g of pentaerythrityl tetrakis(3-laurylthiopropionate) (manufactured by Sumitomo Chemical Co., Ltd., trade name: Sumilizer TP-D) were added to the polymerization solution to prepare a mixture. Most of volatile contents in the mixture was evaporated at normal temperature for 24 hours, followed by drying under reduced pressure at 55° C. for 12 hours to yield a conjugated diene copolymer.

<Preparation of Polymer Composition>

100 parts by mass of the conjugated diene copolymer was kneaded with 80.0 parts by mass of silica (manufactured by Evonik Industries AG, trade name: Ultrasil VN3-GR), 6.4 parts by mass of a silane coupling agent (manufactured by Evonik Industries AG, trade name: Si69), 5.0 parts by mass of carbon black (manufactured by Mitsubishi Chemical Corporation, trade name: DIABLACK N339), 40.0 parts by mass of an extender oil (manufactured by JXTG Energy Corporation, trade name: JOMO Process NC-140), 2.0 parts by mass of an antioxidant (manufactured by Sumitomo Chemical Co., Ltd., trade name: Antigen 6C), 1.5 parts by mass of a wax (manufactured by Ouchi Shinko Chemical Industrial Co., Ltd., trade name: SUNNOC N), 2.0 parts by mass of a wax (manufactured by Schill+Seilacher GmbH, trade name: Struktol EF44), 2.0 parts by mass of stearic acid (manufactured by New Japan Chemical Co., Ltd., trade name: Stearic acid 50S), and 2.0 parts by mass of zinc oxide (manufactured by Seido Chemical Industry Co., Ltd., trade name: two zinc oxides) with a Labo Plastomill to prepare a polymer composition.

<Preparation of Vulcanized Sheet>

2.0 parts by mass of a vulcanization accelerator (manufactured by Kawaguchi Chemical Industry Co. LTD., trade name: ACCEL CZ-R), 1.5 parts by mass of a vulcanization accelerator (manufactured by Kawaguchi Chemical Industry Co. LTD., trade name: ACCEL D-R), and 1.5 parts by mass of sulfur (manufactured by Tsurumi Chemical Industry Co., Ltd., trade name: Pulverized sulfur 200 mesh) were added to the polymer composition, and the polymer composition was molded into a sheet with a 6-inch roll; and the sheet was vulcanized by heating at 160° C. for 55 minutes to prepare a vulcanized sheet.

Example 2

A polymerization reactor made of stainless steel, having an inner volume of 20 L, and provided with a stirrer was washed and dried, and the atmosphere inside the polymerization reactor was purged with nitrogen. Next, 10.2 kg of hexane for industrial use, 540 g of 1,3-butadiene, 180 g of styrene, 6.08 mL of tetrahydrofuran, and 4.24 mL of ethylene glycol diethyl ether were placed into the polymerization reaction vessel. Next, a small amount of hexane solution of n-BuLi as a scavenger was placed into the polymerization reactor, an n-hexane solution containing 13.33 mmol of n-BuLi was placed to start polymerization.

Copolymerization of 1,3-butadiene and styrene was performed for 2.5 hours. During the polymerization, the stirring rate was controlled to 130 rpm, the temperature inside the polymerization reactor was controlled to 65° C., and 810 g of 1,3-butadiene and 270 g of styrene were continuously fed into the polymerization reaction vessel. After a polymerization reaction was performed for 20 minutes, 7.49 mmol of bis(diethylamino)methylvinylsilane was placed into the polymerization reactor to perform a polymerization reaction for 160 minutes. Subsequently, while the temperature was being kept at 65° C., the resulting polymerization solution was stirred in the polymerization reactor at a stirring rate of 130 rpm, and 4.40 mmol of BiTEMPS-Gli as a coupling agent was added to the polymerization solution, followed by stirring for minutes. Next, 7.55 mmol of N-β-dimethylaminopropyl)acrylamide (hereinafter, abbreviated to "PAM") as a modifier was added to the polymerization solution, followed by stirring for 15 minutes. Subsequently, 20 mL of a hexane solution containing 0.8 mL of methanol was placed into the polymerization reactor, and the polymerization solution was stirred for 5 minutes.

10.8 g of 4,6-bis(octylthiomethyl)-o-cresol (available from BASF SE, trade name: Irganox 1520L) was added to the polymerization solution to prepare a mixture. Most of volatile contents in the mixture was evaporated at normal temperature for 24 hours, followed by drying under reduced pressure at 55° C. for 12 hours to yield a conjugated diene copolymer. A polymer composition was prepared in the same manner as in Example 1 except that the copolymer was used, and a vulcanized sheet was prepared in the same manner as in Example 1.

Example 3

A conjugated diene copolymer was prepared in the same manner as in Example 2 except that an n-hexane solution containing 11.1 mmol of n-BuLi was used instead of an n-hexane solution containing 13.3 mmol of BuLi, BiTEMPS-Gli was added in an amount of 3.91 mmol rather than 4.40 mmol, 25.2 mmol of polyorganosiloxane represented by the following formula (10a) in terms of the number of repeating units of —Si—O— was added instead of 7.55 mmol of PAM to perform a reaction for 15 minutes; thereafter, 11.85 mmol of 3-(2-aminoethylamino)propyltrimethoxysilane (compound in which $R^{13}$ in the formula (7) is a methoxy group, $R^{14}$ is a 3-(2-aminoethylamino)propyl group, p is 0, q is 3, and r is 1) was added to perform a reaction for 15 minutes. A polymer composition was prepared in the same manner as in Example 1 except that the copolymer was used, and a vulcanized sheet was prepared in the same manner as in Example 1.

[Chemical Formula 23]

$$R^{21}-\underset{X^{21}}{\overset{R^{22}}{Si}}-O-\left[\underset{X^{22}}{\overset{R^{23}}{Si}}-O\right]_{80}-\left[\underset{R^{26}}{\overset{R^{25}}{Si}}-O\right]_{120}-\underset{X^{24}}{\overset{R^{27}}{Si}}-R^{28} \quad (10a)$$

$X^{22}: -C_3H_6-O-CH_2-CH\overset{\diagdown}{\underset{O}{-}}CH_2$ $X^{21}, X^{24}, R^{21} \sim R^{23}, R^{25} \sim R^{28}: -CH_3$

Comparative Example 1

A conjugated diene copolymer was prepared in the same manner as in Example 1 except that 2.11 mmol of dimethyldichlorosilane was used as a coupling agent instead of BiTEMPS-Gli. A polymer composition was prepared in the same manner as in Example 1 except that the copolymer was used, and a vulcanized sheet was prepared in the same manner as in Example 1.

Comparative Example 2

A conjugated diene copolymer was prepared in the same manner as in Example 1 except that an n-hexane solution containing 10.4 mmol of n-BuLi was used instead of the n-hexane solution containing 9.62 mmol of BuLi and 2.25 mmol of dimethyltin dichloride was used as a coupling agent instead of BiTEMPS-Gli. A polymer composition was prepared in the same manner as in Example 1 except that the copolymer was used, and a vulcanized sheet was prepared in the same manner as in Example 1.

Comparative Example 3

A conjugated diene copolymer was prepared in the same manner as in Example 2 except that 2.467 mmol of dimethyldichlorosilane was used as a coupling agent instead of BiTEMPS-Gli. A polymer composition was prepared in the same manner as in Example 1 except that the copolymer was used, and a vulcanized sheet was prepared in the same manner as in Example 1.

Comparative Example 4

A conjugated diene copolymer was prepared in the same manner as in Example 2 except that 2.893 mmol of dimethyltin dichloride was used as a coupling agent instead of BiTEMPS-Gli. A polymer composition was prepared in the same manner as in Example 1 except that the copolymer was used, and a vulcanized sheet was prepared in the same manner as in Example 1.

FIG. 1 shows GPC charts of the conjugated diene copolymer in Example 1 measured at 40° C. and 60° C., and FIG. 2 shows GPC charts of the conjugated diene copolymer in Comparative Example 1 measured at 40° C. and 60° C.

TABLE 1

| Coupling agent | Example 1 BiTEMPS-Gli | Comparative Example 1 Dimethyl-dichlorosilane | Comparative Example 2 Dimethyltin dichloride |
| --- | --- | --- | --- |
| Styrene units content (% by mass) | 25 | 25 | 25 |
| Vinyl bond amount (mol %) | 57 | 57 | 56 |
| Mooney viscosity | 52 | 52 | 53 |
| Mw | 330000 | 320000 | 310000 |
| Area change rate (%) | 11 | 1 | −1 |
| Compound Mooney viscosity | 40 | 51 | 37 |
| Tensile strength at break | 97 | 100 | 91 |
| Resistance to wear | 100 | 100 | 94 |
| Grip properties | 100 | 100 | 100 |
| Fuel efficiency | 91 | 100 | 103 |

TABLE 2

| Coupling agent | Example 2 BiTEMPS-Gli | Example 3 BiTEMPS-Gli | Comparative Example 3 Dimethyl-dichlorosilane | Comparative Example 4 Dimethyltin dichloride |
| --- | --- | --- | --- | --- |
| Styrene units content (% by mass) | 26 | 26 | 26 | 26 |
| Vinyl bond amount (mol %) | 58 | 59 | 58 | 58 |
| Mooney viscosity | 55 | 62 | 49 | 51 |
| Mw | 320000 | 310000 | 310000 | 320000 |
| Area change rate (%) | 12 | 29 | −12 | −11 |
| Compound Mooney viscosity | 46 | 42 | 52 | 45 |
| Tensile strength at break | 96 | 96 | 100 | 69 |
| Resistance to wear | 100 | 102 | 100 | 107 |
| Grip properties | 98 | 103 | 100 | 99 |
| Fuel efficiency | 100 | 94 | 100 | 100 |

The invention claimed is:
1. A conjugated diene copolymer having a structure represented by the following formula (1):

[Chemical Formula 1]

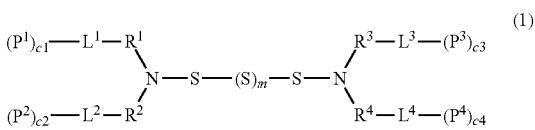

wherein in the formula (1), m represents an integer of 0 to 30, $P^1$, $P^2$, $P^3$, and $P^4$ represent a polymer chain containing conjugated diene units, c1, c2, c3, and c4 each independently represent an integer of 0 to 3, c1+c2+c3+c4 is 1 or more, $R^1$, $R^2$, $R^3$, and $R^4$ represent a hydrocarbyl group optionally having a substituent or $R^1$ and $R^2$ and/or $R^3$ and $R^4$ are bonded to represent a hydrocarbylene group or an aromatic heterocyclic ring optionally having at least one atom selected from the group consisting of a silicon atom, a nitrogen atom, and an oxygen atom, and $L^1$, $L^2$, $L^3$, and $L^4$ represent a hydrogen atom or any bonding group, with the proviso that at least one of $L^1$, $L^2$, $L^3$ and $L^4$ represents a bonding group, the bonding group represents a structure obtained by a reaction of a functional group reactive with a conjugated diene copolymer having an active terminal, and the functional group is selected from the group consisting of a glycidyl ether group, an alkoxy group, a phenoxy group, a benzyloxy group, an alkoxysilyl group, and a halogen group.

2. The conjugated diene copolymer according to claim 1, having a cyclic structure in which $R^1$ and $R^2$ are bonded and a cyclic structure in which $R^3$ and $R^4$ are bonded in the formula (1).

3. A method for manufacturing a conjugated diene copolymer according to claim 1, the method comprising:
- a step of polymerizing a monomer containing a conjugated diene compound in a hydrocarbon solvent in the presence of a polymerization initiator to yield a conjugated diene copolymer having an active terminal; and
- a step of reacting the conjugated diene copolymer having an active terminal with a compound having a covalent bond reversibly dissociated and added by heat to yield a conjugated diene copolymer having the covalent bond, wherein the compound is a compound represented by the following formula (2)

[Chemical Formula 2]

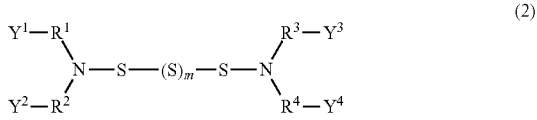

(2)

wherein in the formula (2), m represents an integer of 0 to 30, $R^1$, $R^2$, $R^3$, and $R^4$ represent a hydrocarbyl group optionally having a substituent or $R^1$ and $R^2$ and/or $R^3$ and $R^4$ are bonded to represent a hydrocarbylene group or an aromatic heterocyclic ring optionally having at least one atom selected from the group consisting of a silicon atom, a nitrogen atom, and an oxygen atom, and at least one $Y^1$, $Y^2$, $Y^3$, and $Y^4$ represents a functional group reactive with a diene copolymer having an active terminal, the remaining $Y^1$, $Y^2$, $Y^3$, and $Y^4$ groups representing a hydrogen atom, and wherein the functional group is selected from the group consisting of a glycidyl ether group, an alkoxy group, a phenoxy group, a benzyloxy group, an alkoxysilyl group, and a halogen group.

4. The method for manufacturing a conjugated diene copolymer according to claim 3, further comprising a step of reacting the conjugated diene copolymer having an active terminal with a modifier containing a heteroatom to introduce a unit based on the modifier into the conjugated diene copolymer.

5. The method for manufacturing a conjugated diene copolymer according to claim 3, wherein a modifier containing a heteroatom is added in the step of yielding the conjugated diene copolymer having an active terminal.

6. The conjugated diene copolymer according to claim 1, further having a unit based on a modifier containing a heteroatom.

7. The conjugated diene copolymer according to claim 2, further having a unit based on a modifier containing a heteroatom.

8. The method for manufacturing a conjugated diene copolymer according to claim 4, wherein a modifier containing a heteroatom is added in the step of yielding the conjugated diene copolymer having an active terminal.

* * * * *